US012487875B1

(12) United States Patent
Côrte-Real et al.

(10) Patent No.: US 12,487,875 B1
(45) Date of Patent: Dec. 2, 2025

(54) CONVERSATIONAL AUTOMATED EVENT RESPONSE AND REMEDIATION

(71) Applicant: PagerDuty, Inc., San Francisco, CA (US)

(72) Inventors: José Côrte-Real, Lisbon (PT); Irena Grabovitch-Zuyev, Fredericton (CA); João Freitas, Lisbon (PT); Carolina Costa, Lisbon (PT); Damon Edwards, San Francisco, CA (US); Sean Scott, Seattle, WA (US)

(73) Assignee: PagerDuty, Inc., San Francisco, CA (US)

( * ) Notice: Subject to any disclaimer, the term of this patent is extended or adjusted under 35 U.S.C. 154(b) by 101 days.

(21) Appl. No.: 18/509,214

(22) Filed: Nov. 14, 2023

(51) Int. Cl.
*G06F 11/07* (2006.01)

(52) U.S. Cl.
CPC ...... *G06F 11/0769* (2013.01); *G06F 11/0709* (2013.01); *G06F 11/079* (2013.01); *G06F 11/0793* (2013.01)

(58) Field of Classification Search
CPC ............. G06F 11/0769; G06F 11/0709; G06F 11/079; G06F 11/0793
See application file for complete search history.

(56) References Cited

U.S. PATENT DOCUMENTS

| | | | |
|---|---|---|---|
| 9,189,317 B1 * | 11/2015 | Marimuthu | G06F 11/3065 |
| 9,703,536 B2 * | 7/2017 | Dettman | G06F 11/366 |
| 10,747,559 B2 * | 8/2020 | Caldwell | G06F 11/079 |
| 11,061,800 B2 * | 7/2021 | Prakash | G06F 40/205 |
| 12,020,140 B1 * | 6/2024 | Mondlock | G06N 3/0455 |
| 2005/0066234 A1 | 3/2005 | Darringer et al. | |
| 2015/0067861 A1 | 3/2015 | Foley et al. | |
| 2018/0293386 A1 | 10/2018 | Barouni Ebrahimi et al. | |
| 2022/0179731 A1 | 6/2022 | Jung et al. | |

(Continued)

FOREIGN PATENT DOCUMENTS

CN 111124922 A 5/2020

OTHER PUBLICATIONS

Lewis, P. et al, "Retrieval-Augmented Generation for Knowledge-Intensive NLP Tasks," https://doi.org/10.48550/arXiv.2005.11401 [cs.CL], Apr. 12, 2021, Proceedings of Advances in Neural Information Processing Systems (NeurIPS 2020), 19 pages.

(Continued)

*Primary Examiner* — Joseph R Kudirka
(74) *Attorney, Agent, or Firm* — Baker Botts L.L.P.

(57) ABSTRACT

In one embodiment, a computer-implemented method executed using one or more processors of an incident management system comprises receiving a notification of an incident associated with a computer system, and in response to receiving the notification: extracting an error message from the notification; reading a set of computer program code changes that have been implemented in the computer system; matching the error message to the set of computer program code changes and outputting a set of one or more candidate code changes that may correspond to the error message; based on the set of candidate code changes, generating an automatic remediation for the incident; and using the one or more processors of the incident management system, executing the automatic remediation on the computer system.

22 Claims, 10 Drawing Sheets

(56) References Cited

U.S. PATENT DOCUMENTS

| | | | | |
|---|---|---|---|---|
| 2023/0099916 A1* | 3/2023 | Teyer | ............... | G06F 11/0754 714/3 |
| 2024/0126795 A1* | 4/2024 | Zhong | ............... | H04L 51/02 |
| 2024/0184661 A1* | 6/2024 | Mishra | ............... | G06F 11/0793 |
| 2024/0345911 A1* | 10/2024 | Bellam | ............... | G06F 11/0709 |

OTHER PUBLICATIONS

Ahmed, Toufique et al, "Recommending Root-Cause and Mitigation Steps for Cloud Incidents using Large Language Models," https://arxiv.org/arXiv:2301.03797v2 [cs.SE] Feb. 9, 2023, Microsoft Research, 13 pages.

Khvorov, Aleksandr et al, "S3M: Siamese Stack (Trace) Similarity Measure," http://arxiv.org/abs/2103.10526 arXiv:2103.10526 [cs.SE], Mar. 18, 2021, 5 pages.

Vasiliev, Roman, et al, "TraceSim: A Method for Calculating Stack Trace Similarity," http://arxiv.org/abs/2009.12590, arXiv:2009.12590, Sep. 26, 2020, Saint Petersburg State University, Russia, ITMO University, Russia, 6 pages.

Paixao, Matheus et al, "CROP: Linking Code Reviews to Source Code Changes," May 28, 2018, 2018 IEEE/ACM 15th International Conference on Mining Software Repositories (MSR), Gothenburg, Sweden, 4 pages.

Husain, Hamel et al, "CodeSearchNet Challenge: Evaluating the State of Semantic Code Search," http://arxiv.org/abs/1909.09436, arXiv:1909.09436, Jun. 8, 2020, GitHub, Microsoft Research, 6 pages.

Li, Zhiyu et al, "Automating Code Review Activities by Large-Scale Pre-training," http://arxiv.org/abs/2203.09095, arXiv:2203.09095, Oct. 11, 2022, ESEC/FSE '22, Nov. 14-18, 2022, Singapore, Singapore, 13 pages.

Jingkai, Siow et al, "CORE: Automating Review Recommendation for Code Changes," http://arxiv.org/abs/1912.09652, arXiv:1912.09652, Dec. 20, 2019, School of Computer Science and Engineering, Nanyang Technology University, Singapore 12 pages.

Balasubramanian, Gowri et al, "Choosing the Right DynamoDB Partition Key," https://aws.amazon.com/blogs/database/choosing-the-right-dynamodb-partition-key, Feb. 20, 2017, Amazon DynamoDB, Database, Intermediate (200), 8 pages.

Yang, Jeong Rok, International Search Report and Written Opinion, Application No. PCT/US2024/055407, dated Feb. 20, 2025, 10 pages, pub. by the Korean Intellectual Property Office, Daejeon, Republic of Korea.

* cited by examiner

CONVERSATIONAL AUTOMATED EVENT RESPONSE AND REMEDIATION

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright or rights. © 2023 PagerDuty, Inc.

TECHNICAL FIELD

One technical field of the present disclosure is computer incident management systems. Another technical field is generative artificial intelligence (AI).

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

Incident response systems and incident management systems are distributed computer systems that are programmed to provide structured ways for enterprises to identify, respond to, and/or manage service problems or failures, security breaches, and/or cyberattacks. The goal of incident response is to restore the operation of services, servers, or virtual compute instances, limit damage, recover quickly, and prevent future similar issues or attacks.

While many incident response systems and incident management systems are sophisticated and have extensive functionality, improvements can be made. For example, incident commanders and responders often have limited visibility into key information about the incident, resulting in a lack of context, a lack of an understanding of the systems or customer impact, the triggers and contributing factors of the incident, and how to fix or mitigate the issue. Often incidents are logged with just the error message without providing the impact or outcome of the error. Given that time is a key factor in high-impacting critical Incidents. Incident commanders, responders, and subject matter experts (SMEs) spend many minutes trying to piece together multiple data points and mobilize multiple people to understand the context and customer impact of the issue. A responder often has to review tens or hundreds of recent changes and pages of log files which take minutes to hours depending on the complexity of the incident. There is often no guidance provided to the incident responder on what to do next to fix the issue and different stakeholders are often in the dark or missing information about what is happening during an incident.

Furthermore, reducing mean time to resolution (MTTR) is a continuing goal, and developers in the relevant fields constantly seek systems that can present useful data faster.

Based on the foregoing, the referenced technical fields have developed an acute need for better ways to implement incident response systems and incident management systems.

SUMMARY

The appended claims may serve as a summary of the invention.

DETAILED DESCRIPTION

Figure 1A:
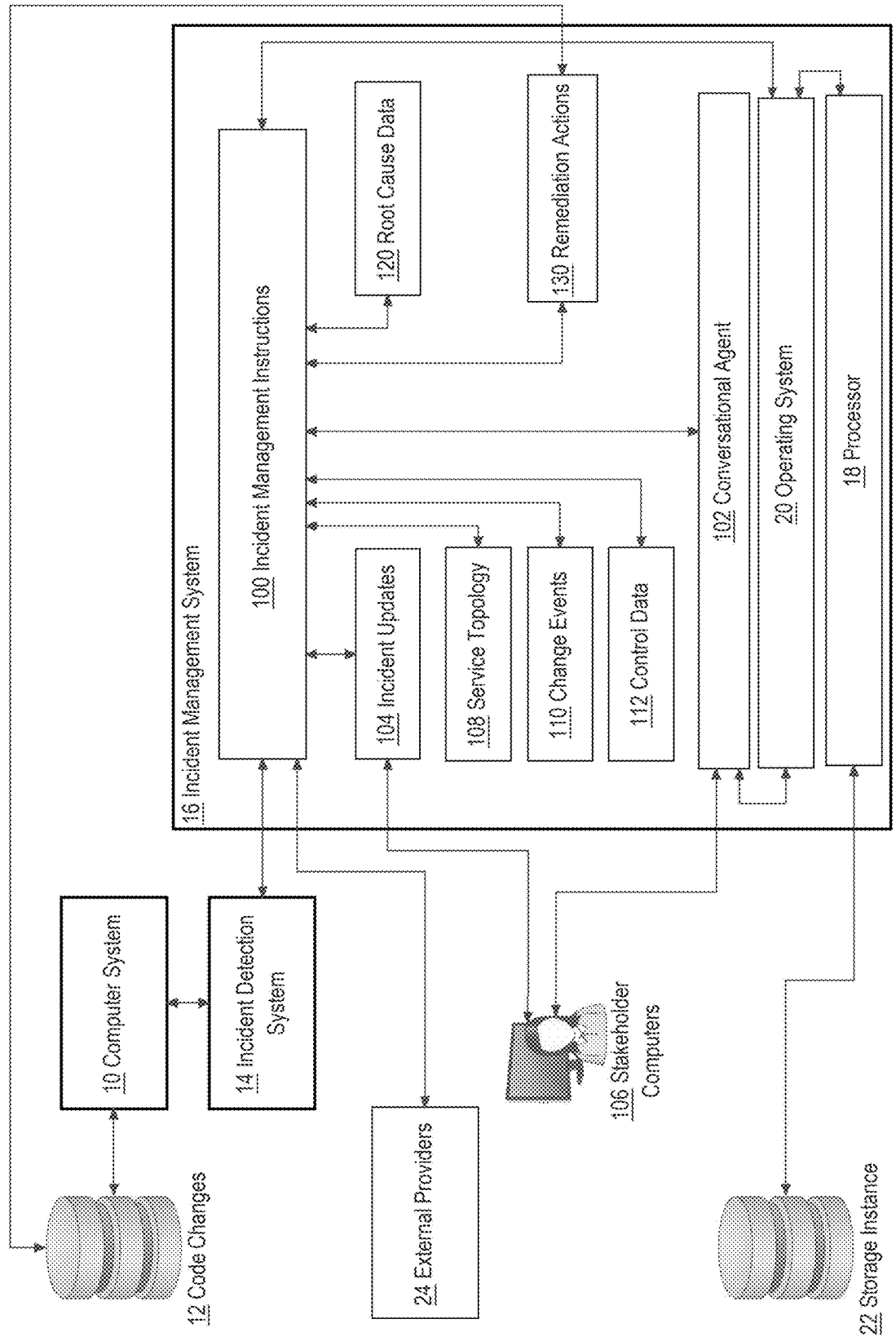
FIG. 1A illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program the computer to implement the claimed inventions at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

This disclosure may describe one or more different inventions, with alternative embodiments to illustrate examples. Other embodiments may be utilized, and structural, logical, software, electrical, and other changes may be made without departing from the scope of the particular inventions. Various modifications and alterations are possible and expected. Some features of one or more of the inventions may be described with reference to one or more particular embodiments or drawing figures, but such features are not limited to usage in the one or more particular embodiments or figures with reference to which they are described. Thus, the present disclosure is neither a literal description of all embodiments of one or more inventions nor a listing of features of one or more inventions that must be present in all embodiments.

Headings of sections and the title are provided for convenience but are not intended to limit the disclosure in any way or as a basis for interpreting the claims. Devices described as in communication with each other need not be in continuous communication with each other unless expressly specified otherwise. In addition, devices that communicate with each other may communicate directly or indirectly through one or more intermediaries, logical or physical.

A description of an embodiment with several components in communication with one other does not imply that all such components are required. Optional components may be described to illustrate a variety of possible embodiments and to illustrate one or more aspects of the inventions fully. Similarly, although process steps, method steps, algorithms, or the like may be described in sequential order, such processes, methods, and algorithms may generally be configured to work in different orders unless specifically stated to the contrary. Any sequence or order of steps described in this disclosure is not a required sequence or order. The steps of the described processes may be performed in any order practical. Further, some steps may be performed simultaneously. The illustration of a process in a drawing does not exclude variations and modifications, does not imply that the process or any of its steps are necessary to one or more of the invention(s), and does not imply that the illustrated process is preferred. The steps may be described once per embodiment but need not occur only once. Some steps may be omitted in some embodiments or occurrences, or some steps may be executed more than once in a given embodiment or occurrence. When a single device or article is described, more than one device or article may be used in place of a single device or article. Where more than one device or article is described, a single device or article may be used instead of more than one device or article.

The functionality or features of a device may be alternatively embodied by one or more other devices that are not explicitly described as having such functionality or features. Thus, other embodiments of one or more inventions need not include the device itself. Techniques and mechanisms described or referenced herein will sometimes be described in singular form for clarity. However, it should be noted that particular embodiments include multiple iterations of a technique or manifestations of a mechanism unless noted otherwise. Process descriptions or blocks in figures should be understood as representing modules, segments, or portions of code, including one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved.

1. GENERAL OVERVIEW

Embodiments implement an artificial intelligence-based assistant that can access a central knowledge base and act as a virtual expert with seamless integration into existing incident response processes. A chat prompt interface enables an efficient interactive flow of queries or prompts, automatic evaluation of the prompts, in the context of other information related to an incident, and automatic generation of code, scripts, or other remediation elements that can be deployed to a system involved in an incident. In various embodiments, the disclosure encompasses the subject matter of the following numbered clauses:

1. A computer-implemented method executed using one or more processors of an incident management system, the method comprising: receiving a notification of an incident associated with a computer system, and in response to receiving the notification: extracting an error message from the notification; reading a set of computer program code changes that have been implemented in the computer system; matching the error message to the set of computer program code changes and outputting a set of one or more candidate code changes that may contribute to the error message; based on the set of candidate code changes, generating an automatic remediation for the incident; using the one or more processors of the incident management system, executing the automatic remediation on the computer system.

2. The computer-implemented method of clause 1, further comprising: causing presenting the automatic remediation in one or more visual displays of one or more computer display devices respectively associated with one or more stakeholder computers that are communicatively coupled to the incident management system; executing the automatic remediation on the computer system only in response to input from at least one particular stakeholder computer among the one or more stakeholder computers, the input specifying an approval of the automatic remediation.

3. The computer-implemented method of clause 1, the incident comprising any of reduced service performance, downtime, outage, or failure of the computer system.

4. The computer-implemented method of clause 1, further comprising: creating and transiently storing in memory a prompt comprising at least the error message and one or more particular code changes from among the set of one or more candidate code changes; transmitting the prompt to a machine-learning model and receiving a response from the machine-learning model; determining that the response from the machine-learning model contains an explanation concerning contributing factors corresponding to the incident and, in response, causing presenting the root-cause explanation in one or more visual displays of one or more computer display devices respectively associated with one or more stakeholder computers that are communicatively coupled to the incident management system.

5. The computer-implemented method of clause 4, further comprising: creating and transiently storing in memory the prompt comprising an instruction to explain one or more particular code changes from among the set of one or more candidate code changes; or creating and transiently storing in memory the prompt comprising an instruction to explain the error message; or creating and transiently storing in memory the prompt comprising an instruction to state whether the one or more particular code changes from among the set of one or more candidate code changes relate to the error message.

6. The computer-implemented method of clause 4, further comprising receiving a stacktrace corresponding to the incident and matching the stacktrace to the set of computer program code changes that have been implemented in the computer system and outputting the set of one or more candidate code changes that may correspond to the error message.

7. The computer-implemented method of clause 6, further comprising matching the stacktrace to the set of computer program code changes that have been implemented in the computer system and outputting the set of one or more candidate code changes that may correspond to the error message by: programmatically calling a neural network-based machine learning model, a Transformer-based machine learning model, or a T5 Transformer-based machine-learning model and providing the stacktrace and the set of computer program code changes to create embeddings; executing an inference stage of the T5 Transformer-based machine-learning model to produce an embeddings index; selecting, from the embeddings index, a top-N set of code changes as the one or more particular code changes from among the set of one or more candidate code changes.

8. The computer-implemented method of clause 7, the T5 Transformer-based machine-learning model having been trained using a training data set comprising at least 1,000 pairs of function code and function documentation.

9. The computer-implemented method of clause 4, wherein the machine-learning model comprises a large language model (LLM).

10. The computer-implemented method of clause 4, further comprising transmitting the prompt to the machine-learning model by calling an application programming interface (API) of an LLM comprising OPENAI GPT 3.5 or OPENAI GPT 4.0.

11. The computer-implemented method of clause 4, further comprising: receiving a user message at a conversational agent executing in the incident management system; using the conversational agent, identifying a task represented in the user message; initiating, from among a worker pool of worker threads, an execution of a task worker thread corresponding to the task; transmitting the prompt to the machine-learning model when the task corresponds to an incident context task, change events task, or service context task.

2. STRUCTURAL & FUNCTIONAL OVERVIEW

2.1 Distributed Computer System Example

FIG. 1A illustrates a distributed computer system showing the context of use and principal functional elements with which one embodiment could be implemented. In an embodiment, a computer system organized as an incident management system 16 comprises components implemented partially by hardware at one or more computing devices, such as one or more hardware processors 18 executing stored program instructions stored in one or more storage instances 22 for performing the functions described herein. In other words, all functions described herein are intended to indicate operations performed using programming in a special or general-purpose computer in various embodiments. FIG. 1A illustrates only one of many possible arrangements of components configured to execute the programming described herein. Other arrangements may include fewer or different components, and the division of work between the components may vary depending on the arrangement.

FIG. 1A, and the other drawing figures and all of the description and claims in this disclosure, are intended to present, disclose, and claim a technical system and technical methods in which specially programmed computers, using a special-purpose distributed computer system design, execute functions that have not been available before to provide a practical application of computing technology to the problem of automatic remediation of computer incidents. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

In an embodiment, computer system 10 is the subject of incident detection and remediation. Computer system 10 is communicatively coupled to code changes 12, which represent a set of computer program code changes that have been implemented in computer system 10 and might form the cause of an incident, such as reduced service performance, downtime, outage, or failure. Code changes 12 can be stored in data storage associated with the computer system 10, in data storage associated with the incident detection system 14, or in an independent repository such as GITHUB or BITBUCKET. The computer system 10 is communicatively coupled to an incident detection system 14, which is programmed to continuously listen for and/or monitor the computer system and identify service issues, errors, failures, attacks, or other incidents. In one embodiment, the incident detection system 14 can be programmed to listen for events that the computer system 10 propagates; a variety of integrations to other services can provide this capability such as DATADOG, BUGSNAG, and others. For purposes of illustrating a clear example, FIG. 1A shows one computer system 10, but practical embodiments can include any number of computer systems that are subject to incident detection using one or more instances of the incident detection system 14.

Incident detection system 14 is communicatively coupled to the incident management system 16, which, as noted previously, is coupled to at least one storage instance 22. The incident management system 16 comprises a processor 18, which hosts or executes system services, primitives, or libraries, which may be integrated into an operating system 20. In one embodiment, the incident management system 16 comprises one or more virtual compute instances in a private data center or public, cloud computing-based data center, and the storage instance 22 comprises one or more virtual storage instances. Alternatively, the incident management system 16 can use an on-prem implementation in one or more server computers, server clusters, or other networked computers.

The incident management system 16 hosts or executes a set of incident management instructions 100 and a conversational agent 102, each comprising one or more computer programs, endpoints, services, methods, or functions that interoperate to execute the functions that are described in other sections. In general, the incident management instructions 100 are programmed to generate and transmit incident updates 104 to stakeholder computers 106 and receive updates from the stakeholder computers; to receive input from a service topology 108 describing the services that the computer system 10 hosts or executes; to receive change events 110 as input, the change events describing the code changes 12 and/or other changes in applications, services, or configuration of the computer system 10; to receive control data 112 as input, the control data comprising definitions of controls, guardrails, or limits on interpretation of incident updates and/or preparation of remediation actions; to interface with the conversational agent 102 to transmit output and receive input based on chat-style conversations of the stakeholder computers 106 with the conversational agent; to output root cause data 120 that describes causes of incidents that the incident detection system 14 detected; and to automatically generate, in part by interfacing with a generative AI system, program code, configuration, or other instructions or data that can be applied to the computer system 10 to remediate or correct an incident.

In an embodiment, incident updates 104 can include metadata relating to incidents. The service topology 108 and change events 110, individually or collectively, can comprise data specifying service changes and/or a service graph. In an embodiment, the incident management system 16 also is communicatively coupled to one or more third-party providers of data that could be relevant to incidents. Examples include codebases or code repositories and customer service data, from services such as GitHub, Zendesk, Salesforce, or others.

In an embodiment, the conversational agent 102 comprises one or more sets of program instructions that are programmed to receive queries or prompts from one of the stakeholder computers 106 and to interact with an LLM to produce responses that can assist human incident responders by providing context about an event. In an embodiment, the capabilities of the conversational agent 102 and example responses can include:

| Capability | Description | Example |
| --- | --- | --- |
| Summarize incident state | Describe the current state of an ongoing incident | Assistant: "Bob, it looks like we are receiving 4xx errors on the API Load Balancer technical service that supports the B2B Order Processing Business Service." |
| Check first-party services | Check the services that are related to the ongoing incident and their status | Assistant: "I've also checked any related services that might be contributing to this incident and all technical services are reporting healthy." |
| Summarize incident timeline and changes | Ability to describe the incident in timeline mode and what has happened to the service before the incident. | Assistant: "The initial event triggered 10 minutes ago and was delayed by transient detection as these usually heal in 5 minutes or less. This morning, a new release supporting enhanced catalog search was published to the Android and iOS app stores. See related changes:" |
| Classify changes | Classify code changes against an operational error | |
| Explore logs | Explore operational logs and detect relevant anomalies | |
| External retrieval | Retrieve documentation from a documentation store relevant to the incident at hand | Fetching data from operational guidelines from a service, from confluence, other internal wiki, or other source |
| Check on-call | Able to provide who is on-call for a service | Sophie: "Who is on call for OWT?" |
| Add responder | Add a new responder to the current incident | Nikhil: "Add @JohnDoe as a responder" |
| Service context | Provide the current state of a given service | Nathan: "Is there anything wrong with the OWT service?" |
| Check third-party services | If the alerts aren't generated directly to the service, check the path of the alert to ensure all systems on the path are OK. | Claudia: "The alerts are coming from Cloud infrastructure through ServerMonitor, so I checked to make sure they aren't having any issues:" |
| Generate suggested prompts | Ability to help responders trace or get information with proposals of prompts related to the incident. | Ben: 1."When did the 4xx errors start, and what else happened at that time?"<br>Ben: 2."What Diagnostics are available to help with 4xx errors?" |
| Past remediations | Provide information on how previous related incidents were remediated through history and postmortem information | Alice: "What have we done in the past for incidents like this?"<br>Assistant: "The most recent incident I can find where 4xx errors were elevated, a Rolling Restart of the cluster was able to resolve the issue after completion; however, there were no recent changes at the time. Three months ago, Bob responded to a similar incident related to application updates and had to initiate a code rollback on the API endpoints until engineering was able to fix the application." |
| Audit log and summarization | Ability to show all changes that have been made since the incident started, including reasons/history for the options taken | Vincent (Predefined question): "Can you summarize what's been done so far?"<br>Assistant: "Sure! Vincent, after investigating this incident, this incident is similar to INC012345 from 3 months ago, where Sarah implemented a code rollback, so Bob determined the incident needed to be escalated to your team. Here are the recent application updates:"<br>Show recent changes for API nodes and mobile applications. |

-continued

| Capability | Description | Example |
|---|---|---|
| Postmortem information retrieval: | Ability to query information from previous postmortems | Vincent: "Thanks! How long did it take Sarah to perform the code rollback once she started the process?"<br>Assistant: "Based on the notes in the incident, it looks like it took anywhere from 5-10 minutes to complete the code rollback and perform initial verification." |
| Status updates | Ability to send internal status updates and update the status page of the given service | Vincent: "Can you send out an internal status update letting everyone know it should be fixed in 15 mins?"<br>Assistant: Sends out status updates to subscribed stakeholders and to the private status page. |
| Monitoring API integration | After remediation, it can perform a health check on the associated systems | Vincent: "Everything is back up and running after the code rollback. How does it look?"<br>Assistant: "Vincent, thanks for checking! It looks like we've received a substantial number of clear events for incidents across the environment." |
| Incident escalation | | Assistant: "In both scenarios, the incident was declared a Major incident. Would you like to do that now?"<br>Vincent: "Yes" |
| Support case API integration | | Vanessa: "How many customers have open cases related to this incident, and are any of them flagged as renewal risk?"<br>Assistant: "There are 23 open CRM service cloud cases linked to this incident. Three of the service cloud cases are for accounts that are flagged as renewal risk: Acme Anvils, Retail4UShopping, and Scooter Share."<br>Vanessa: "Subscribe to the account teams for the impacted customers and send them an update now." |
| Auto remediation | | Assistant: "API Load Balancer incidents do not usually heal on their own and will require user resolution. Would you like me to do that now?" |

The stakeholder computers 106 broadly represent any computing devices of end users related to or concerned with the incidents that the incident management system 16 manages. The stakeholder computers 106 can comprise, in various embodiments, laptop computers, desktop computers, network computers, or mobile computing devices.

In FIG. 1A, arrows that connect computer system 10, code changes 12, incident detection system 14, incident management 16 or its elements, storage instance 22, external providers 24, and stakeholder computers 106 represent network links. For the network links, various embodiments can use any combination of one or more local area networks, wide area networks, campus networks, or internetworks, using wired or wireless links, satellite links, or terrestrial links.

2.2 Data Processing Flow Overview

Figure 1B:
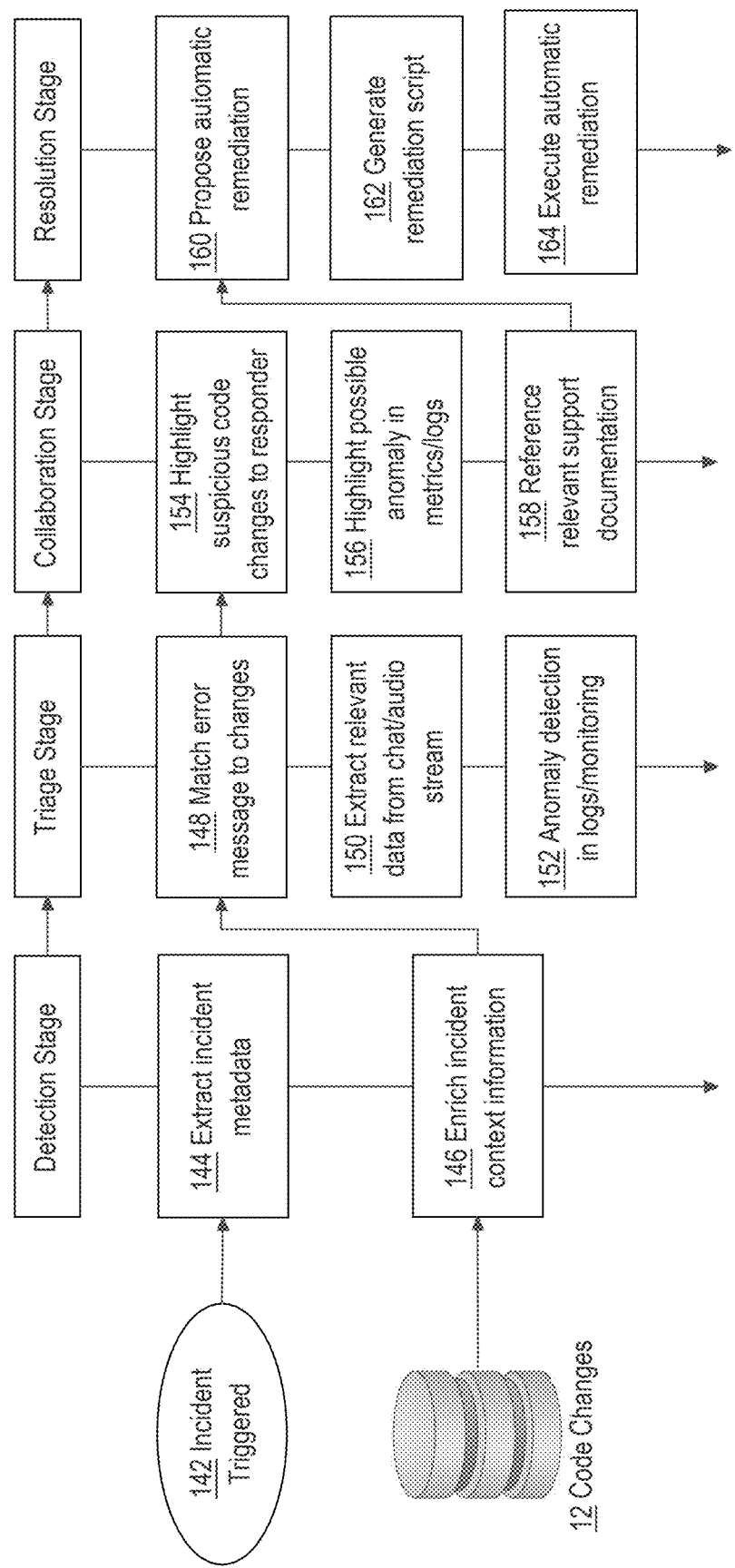
FIG. 1B illustrates a workflow that can be implemented to provide automatic remediation of computer incidents.

FIG. 1B illustrates a workflow that can be implemented to provide automatic remediation of computer incidents. FIG. 1B and each other flow diagram herein are intended as an illustration of the functional level at which persons skilled in the art to which this disclosure pertains communicate with one another to describe and implement a computer-implemented method, as described further herein and/or algorithms using programming. The flow diagrams are not intended to illustrate every instruction, method object, or sub-step that would be needed to program every aspect of a working program but are provided at the same functional level of illustration that is normally used at the high level of skill in this art to communicate the basis of developing working programs.

In operation, the incident management instructions 100 of the incident management system 16 are programmed to process an incident in a plurality of processing stages starting with a detection stage and proceeding to a triage stage, a collaboration stage, and a resolution stage. In an embodiment, the processing of each stage is asynchronous, and the incident management system 16 is programmed using multi-threading techniques or reentrant code to process any number of incidents concurrently, each incident potentially being in a different stage.

Incident processing begins when an incident is triggered at block 142. In one embodiment, incident detection system 14 may detect an incident while monitoring services of the computer system 10 and, in response, generate and transmit or publish a notification, alert, or message to the incident management instructions 100. In another embodiment, an incident can be triggered based on a user message that is transmitted to the conversational agent 102. For example, a user associated with one of the stakeholder computers 106 could receive a notification at that computer from the incident detection system 14 and, in response, begin a chat message conversation with an app mention for a bot, address, or channel tag corresponding to the conversational agent. As detailed in other sections herein, the conversational agent 102 can be programmed for receiving the user message, identifying a task represented in the user message, initiating, from among a worker pool of worker threads, an execution of a task worker thread corresponding to the task, and transmitting the prompt to the machine-learning model when the task corresponds to an incident context task or initiating the detection stage as described next. An incident, in this context, can comprise any of reduced service performance, downtime, outage, or failure of the computer system 10 or any server, service, application, or facility of the computer system.

In response to receiving the notification, alert, or message, or based on programmatic calls or signals from the conversational agent 102 as described above, the incident management instructions 100 enter the detection stage. At block 144, the incident management instructions 100 are programmed to extract or obtain incident metadata corresponding to the incident that was triggered at block 142. For example, block 144 can be programmed to extract an error message from the notification, alert, or message and to read or call incident updates 104 to obtain metadata corresponding to the incident. The error message can be carried as a payload or can be embedded in a subject, body, or other element of the notification, alert, or message and extracting the error message at block 144 can comprise the incident management instructions 100 using regular expressions (regexs) or other pattern-matching heuristics to locate error messages in the notification, alert, or message.

At block 146, the incident management instructions 100 are programmed to enrich the incident context information. For example, block 146 can be programmed to collect recent code changes and other contextual information. by requesting or reading code changes 12 via the incident detection system or, if authorized, a direct read operation or a call to the computer system 10, service topology 108, change events 110, and external providers 24. For example, the incident management system 16 can be provisioned with login credentials, API access keys, or other security credentials for data storage associated with the computer system 10, data storage associated with the incident detection system 14, or in an independent repository such as GITHUB or BITBUCKET. The specific mechanism of access is not critical and "collecting" recent code changes can include any of the foregoing or other functional equivalents. Collecting contextual information can include querying or calling multiple third-party providers and the incident detection system 14, including, in various embodiments: diagnosis tools; application performance monitoring (APM) tools; service communication traces; logs of API calls, error messages, and warning messages; customer service information such as open tickets and/or customer context or history; a service topology graph specifying service dependencies; changes in the impacted services; and information from past or related incidents, for example, from post-mortem reports or documents.

The foregoing information can be collected asynchronously via lazy loading or cager loading, or queries in real-time at block 146. In one embodiment, incident management instructions 100 are programmed for automatically creating a script that will fetch the information needed, in the context of the incident, from one or more of the sources specified above. Thus, a collection script could specify only one of the external providers 24, or one or more of the information sources identified above. Specialized code generation LLMs can generate a script that best matches the diagnosis needs of a particular incident. A prompt and context to such an LLM can use all or some of the information that was previously collected. Alternatively, incident management instructions 100 are programmed to read a stored script template and populate or adapt the template using a classification model.

In an embodiment, block 146 also is programmed to prioritize certain parts of the information. For example, if the logs show an error message but the APM does not capture an anomaly, then incident management instructions 100 can be programmed to prioritize conveying the logs to the responder. Prioritization techniques also can drive user prompting. For example, incident management instructions 100 can be programmed to extract information from post-mortems of related incidents and determine a priority, based on the extracted information, to show available questions to the user.

The incident management instructions 100 then enter the triage stage. The triage of an incident should occur as fast as possible; therefore, in an embodiment, the functions of block 144 through the end of the triage stage should execute in real-time in response to an incident triggered at block 142. In an embodiment, at block 148, the incident management instructions 100 are programmed to match the error message that was extracted at block 144 to the code changes that were obtained at block 146. For example, the error message may identify a method, function, call, or service that failed, did not respond, or threw an error. Typically, matching progressive character sequences based on substrings of the error message will match the error message to the code changes. In one embodiment, block 148 can further comprise translating the error to a natural language representation before comparing with the code changes.

In an embodiment, the triage also comprises, at block 150, extracting relevant data from a chat conversation or audio stream. For example, an embodiment can be programmed to call an instant message or chat server via an integration or API and retrieve text that is associated with an incident. One specific implementation could involve calling a Slack server that hosts the Slack chat conversation service and accessing a channel having a channel identifier that corresponds to an incident identifier, then reading all messages on the channel, filtering out stop words or non-substantive data, and storing the remaining relevant data as additional context. Another implementation could call a teleconferencing server such as a Microsoft Teams server and access a transcript of a call that is tagged with the incident identifier, read and filter the transcript, and store remaining relevant text from the transcript as additional context.

At block 152, the triage stage can include anomaly detection in logs or from monitoring systems. For example, block 152 can be programmed to call the APM to retrieve anomalies, or to independently process log file records using the incident management instructions 100 or by transmitting log data to an LLM for summarization or correlation. Detecting anomalies in log file records can use any of several different programmed techniques. In one embodiment, a plurality of digitally stored regular expressions (regexs) are retrieved and programmatically applied to the log file records and records that match a particular regex will indicate an anomaly. In another embodiment, data-driven or hard-coded programmatic rules or heuristics can be used to parse log file records and identify anomalies.

In other embodiment, anomalies in log file records are detected programmatically using autoencoders, which are a type of neural network that can be used to learn representations of data. They are trained to reconstruct their input, and this process forces them to learn the underlying patterns in the data. Once an autoencoder is trained, it can be used to detect anomalies by looking for inputs that it cannot reconstruct well. To detect anomalies in log file records using autoencoders, the data is preprocessed to convert it into a format that the autoencoder can understand, for example, by converting the data to vectors, or representing each log record as a sequence of tokens. Once the data is preprocessed, an autoencoder is trained on it, causing the autoencoder to learn to reconstruct the log records, and detect anomalies. To detect anomalies, a program can look for log records that the autoencoder cannot reconstruct well. These log records are likely to be anomalous because they do not match the patterns that the autoencoder has learned.

Additionally, or alternatively, implementations can use hourglass-shaped neural networks, a type of neural network that is specifically designed for anomaly detection. They work by compressing the input data and then interpolating it back again. This process forces the network to learn the underlying patterns in the data. Once an hourglass-shaped neural network is trained, it can be used to detect anomalies by looking for inputs that it cannot interpolate well.

Another way to detect anomalies in log file records is to compare the data with ground truth. Ground truth is a set of known anomalous and non-anomalous log records. A ground truth dataset comprises a set of log records that has been labeled as anomalous or non-anomalous. A machine learning model can be trained using the labeled dataset to distinguish between anomalous and non-anomalous log records. Thereafter, the inference stage of the trained ML model can be executed over an input log record to classify whether the log record shows an anomaly.

The different approaches described above can be combined using a funneling approach that filters the log records using a series of filters. Each filter is designed to detect a different type of anomaly. For example, one filter might be used to detect log records that have unusual values for certain fields. Another filter might be used to detect log records that have unusual patterns of events. The funneling approach is effective because it allows combining the strengths of different anomaly detection techniques.

The incident management instructions 100 then enters the collaboration stage. In an embodiment, at block 154, the incident management instructions 100 are programmed to highlight suspicious code changes to a responder. In this context, a "responder" is an individual, account, or computer that is tasked with resolving the incident that was detected. In addition to the processes described herein for embodiments, a responder may take other actions, such as gathering other participants such as analysts, customer liaisons, or other responders. Common questions associated with an incident or issue address where the issue is, which team owns the service, what caused the issue, what is the fix, what is the customer impact; what type of communication is needed (internal or external). "Highlight," in this context, can refer to updating a preexisting or previously presented incident management interface, such as a graphical user interface, by identifying code changes corresponding to the error message using distinct visual attributes such as color, shading, or highlighting. Alternatively, "highlight" can comprise automatically generating and transmitting an e-mail message, text message, chat message, instant message, or other message that presents the code changes with distinct visual attributes and/or other text and/or images to indicate that the code changes could be suspicious.

In an embodiment, at block 156, the incident management instructions 100 are programmed to highlight a possible anomaly in metrics or logs. For example, if the anomaly detection step of block 152 detected an anomaly in a log, block 156 can be programmed to display a range of records of the log file and identify a possible anomaly using visually distinctive presentation such as highlighting, underlining, distinctive color, shading, or other visual techniques. Or, block 156 can comprise generating and displaying a notification, alert, or other visual presentation of the anomaly. The same techniques can be used to highlight one or more possible anomalies that have been identified using the APM or by inspection of other monitoring data.

In an embodiment, at block 158, the incident management instructions 100 are programmed to reference relevant support documentation. For example, the incident management instructions 100 are programmed to query a support documentation server, database or repository to retrieve one or more support documents that correspond to one or more services relating to the incident or that have dependencies on the incident. Support documentation can reside in web servers or storage instance 22. Programmatic search techniques can use semantic similarity to identify the top-N semantically similar documents in comparison to terms derived from an incident. For example, if an incident record or other incident data specifies a failure to connect to a database, "failure/connect/database" can be used as search terms to retrieve the top documents that are semantically similar. Snippets of relevant text from those documents, or the full text of the top documents, can form context that is submitted to an LLM with a prompt to generate other information for the user. In one embodiment, retrieval augmented generation (RAG) approaches can be used. The following process can be programmed. 1. A prompt and a search query are programmatically transmitted to a RAG service. 2. The RAG service extracts the query and submits the query to search engine, a relational database system, or another source of knowledge that manages a corpus of support documents and is capable to executing a semantic search against the corpus based on the query. 3. The search system responds with a result set of documents, or snippets from the documents, which can be treated as relevant information for enhanced context. 4. The RAG service combines the previously received prompt, query, and the relevant information from the search system as context, and submits the combination to an LLM endpoint. 5. A generated text response from the LLM is received and presented directly to the user or subjected to post-processing before presentation to the user. RAG is described in, for example, P. Lewis et al., "Retrieval-Augmented Generation for Knowledge-Intensive NLP Tasks," pub. 2020 in Proceedings of Advances in Neural Information Processing Systems (NeurIPS 2020), available online as arXiv: 2005.11401, available online at https://doi.org/10.48550/arXiv.2005.11401.

The incident management instructions 100 then enters the resolution stage. For example, once the system has a list of incident triggers and contributing factors and their respective probability, incident management instructions 100 can be programmed to replicate all or part of a diagnosis strategy and suggest automatically generated scripts or a script selected from the set of pre-built templates. The system can further enhance resolution automation by running diagnostic scripts that are pre-defined by the user for a given service. This information will be used to increase the accuracy of the proposed automatic resolution process. Finally, the system can automatically create diagnostic and/or remediation automation based on the incident metadata.

In an embodiment, at block 160, the incident management instructions 100 are programmed to automatically propose an automatic remediation. In various embodiments, automatic remediation can comprise a rollback of a previously executed code change, a code modification, the deletion of code, a restart operation, a configuration change, or the initiation of a diagnostic service, each of which is capable of automatic initiation and execution on the computer system 10. The automatic remediation can be created and stored as a configuration file, set of code in a repository, or a set of pipeline orchestration instructions in a structured file or language such as YAML or PYTHON. "Propose," in block 160, can refer to presenting the specified automatic remediation in a preexisting or previously presented incident management interface. Alternatively, "propose" can comprise automatically generating and transmitting an e-mail message, text message, chat message, instant message, or other message that presents the specified automatic remediation. Block 160 can comprise causing presenting the automatic remediation in one or more visual displays of one or more computer display devices respectively associated with the stakeholder computers 106 using HTTP responses with HTML payloads, email message transmission, or responses using the chat or messaging interfaces described herein. Block 160 also can comprise presenting, using any of the foregoing techniques, a root-cause explanation that is received or obtained using the machine-learning model techniques described herein in other sections.

In one embodiment, at block 162, the resolution stage can comprise generating a remediation script. As noted, block 162 can comprise suggesting automatically generated scripts or a script selected from a set of pre-built templates. In one embodiment, block 162 can comprise retrieving scripts that have been created using Runbook Automation from PagerDuty, or requesting the Runbook Automation service to automatically create a script based on specified remediation parameters.

In an embodiment, at block 164, the incident management instructions 100 are programmed to execute the automatic remediation. "Execute" in block 164 can comprise generating a job description and instantiating a scheduled job based on the job description, where the job description specifies launching, executing, or invoking the specified automatic remediation.

2.3 Example Incident Management System Architecture

Figure 2:
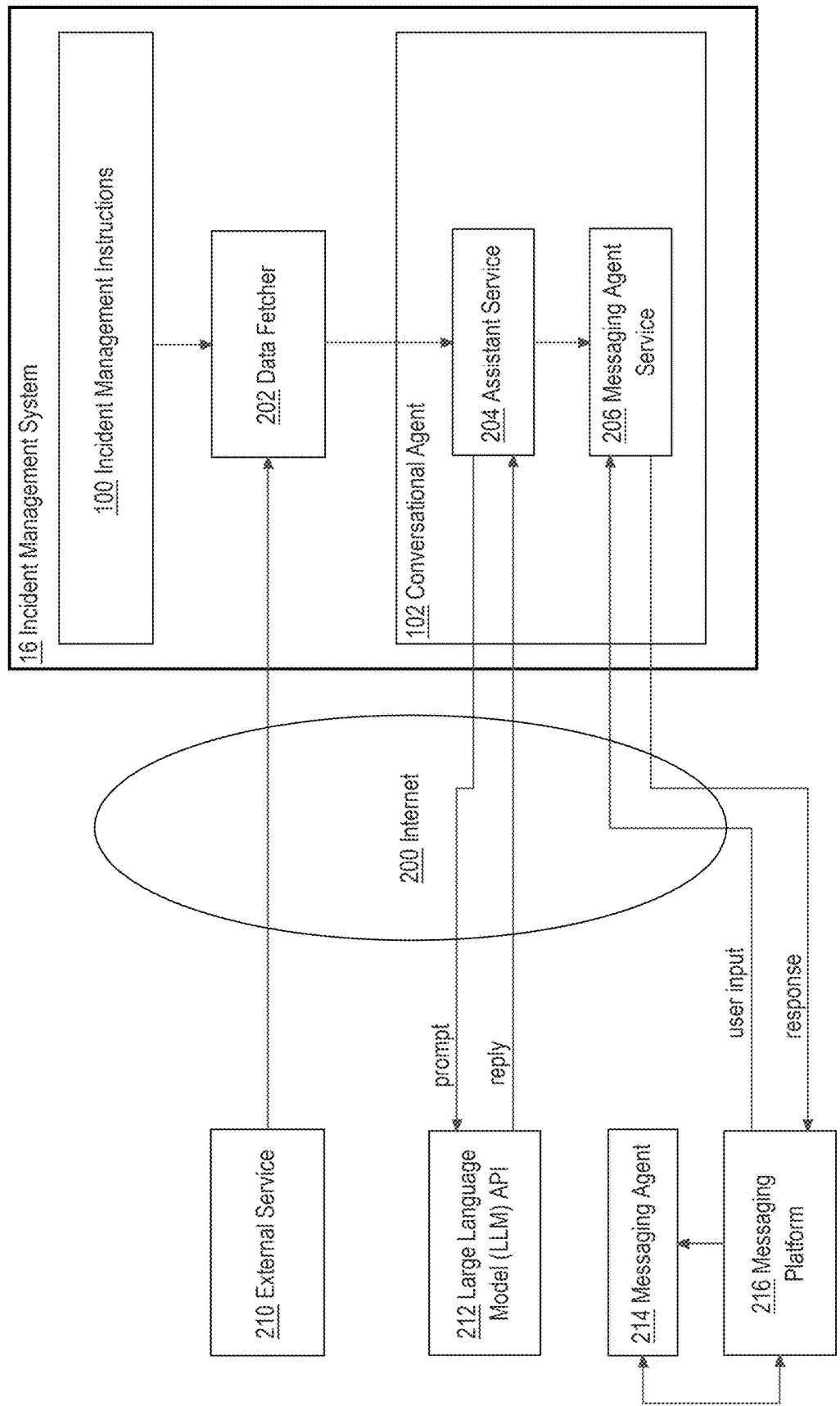
FIG. 2 illustrates an example incident management system with a conversational agent and an interface to a large language model (LLM) of a generative AI system.

FIG. 2 illustrates an example incident management system with a conversational agent and an interface to a large language model (LLM) of a generative AI system. In an embodiment, the incident management system 16 comprises a data fetcher 202 that is communicatively coupled logically between the incident management instructions 100, an assistance service 204, and a messaging agent service 206 within the conversational agent 102.

The data fetcher 202, assistant service 204, and messaging agent service 206 each comprise sets of program instructions that are programmed to execute the functions described in separate sections herein. The data fetcher 202, in general, is programmed to request incident-related data or metadata from an external service 210, which broadly represents any number of independent and/or third-party networked servers, services, APIs, or database systems.

The assistant service 204 is programmed to transmit prompt data and context data to a large language model API or LLM API 212 and to receive replies from the LLM API. The LLM API 212 can be integrated with the incident management service 16, a related service or operator, or independent of them. For example, LLMs with public APIs such as CHATGPT or GOOGLE BARD can be used; LLMs with high-grade security and that do not retain, store, or learn from prompts or contexts, such as CHATGPT ENTERPRISE, are preferred in an embodiment but are not required. Embodiments have been configured for calling the public API OPENAI GPT 3.5 or OPENAI GPT 4.0. A custom-developed and trained GPT or other Transformer-based machine learning model could be used.

The messaging agent service 206 provides, in one embodiment, a programmatic interface to or integration with a messaging platform 216, which communicates messages to and from a messaging agent 214. In various embodiments, the messaging platform 216 comprises any of SLACK, MICROSOFT TEAMS, or ZOOM. Depending on the security limitations that a messaging platform 216 implements, the messaging agent service 206 may be programmed to manage security issues. For example, the messaging agent service 206 can be programmed to request or prompt an authorized representative of an entity to opt into certain security features of the messaging platform 216, for example, to allow the messaging agent service to retrieve information such as channel history from the messaging platform. In such an embodiment, messaging agent 214 can represent a user agent executing on one of the stakeholder computers 106, such as the SLACK app, and messaging platform 216 can represent an enterprise SLACK server.

The messaging agent service 206 can be integrated with back-end elements of the messaging platform 216. Given the messages directed to assistant service 204, the messaging agent service 206 will relay user messages to the assistant service, which is responsible for processing those messages and returning an appropriate response. In an embodiment, the assistant service 204 uses the data fetcher 202 to retrieve data needed to build a correct response from external service 210 or from storage instance 22 (FIG. 1A) for data that is internal to or locally associated with the incident management system 16.

2.3.1 Messaging Agent Service

Figure 3:
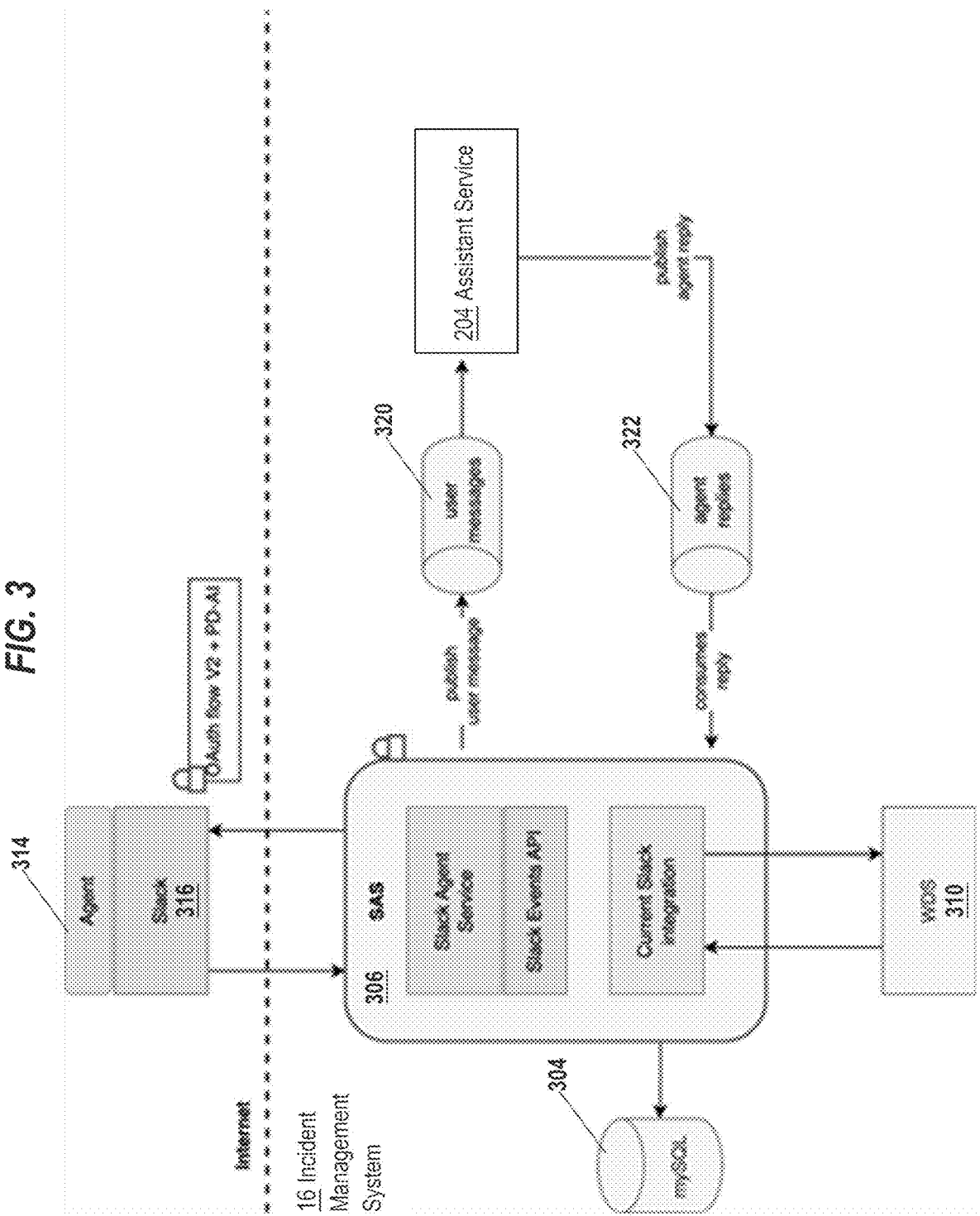
FIG. 3 illustrates an example messaging agent service that can be used in the system of FIG. 2 in one embodiment.

FIG. 3 illustrates an example messaging agent service that can be used in the system of FIG. 2 in one embodiment. While FIG. 3 illustrates one example implementation that integrates with the SLACK instant message service, other embodiments can use functionally similar implementations with other message services depending on how those services approach integration with external applications, calls, or functions. In an embodiment, a messaging agent 314 corresponding to one of the stakeholder computers 106 sends and receives messages via a Slack application 316. Within the incident management system 16, a Slack Assistant Service (SAS) 306 uses a Slack Events API to listen for either app mentions or messages with specific keywords. An app mention can have the form @ai or any other label that signals a message directed to a specific channel, app, or bot. Additionally, or alternatively, users can post messages with specific keywords like "hey-ai," "bot," and so forth. SAS 306 is communicatively coupled via integration software or data to webhook delivery system (WDS) 310.

In an embodiment, SAS 306 publishes user messages 320 to the assistant service 204 via a message bus or event streaming service like APACHE KAFKA and consumes responses from another topic. While SAS 306 waits for messages or events, the SAS can be programmed to transmit writing feedback to the user. Incoming messages and events can comprise agent replies 322 from the assistant service 204. The SAS 306 is programmed to process or consume agent replies 322 and to notify the user via a mention such as "@Customer, [reply]" in the channel in which the user sent user messages 320. In an embodiment, a tally of awaited responses is stored in a database 324, along with an expiration date. In one embodiment, the database is implemented with MYSQL and can be hosted using storage instance 22 (FIG. 1A). When an agent response is consumed from the message bus or event streaming service, the agent response is removed from the tally, and if a response does not arrive within a predetermined time, SAS 306 is programmed to report an error to the user.

In some embodiments, Slack app 316 implements functions not found in standard commercial or enterprise offerings, such as the ability to retrieve channel history. In some embodiments, the Slack app 316 is programmed with additional functions, including: Setting up the new Slack Application with the scopes, logos, and names for an AI bot corresponding to the conversational agent 102; adding the Slack App configurations to Slack Service (App ID, app secret, signing secret); a Slack OAuth flow for the Slack App 316; add new tables to store a mapping between the Slack App and a user account for the incident management system 16; table to store the authorization; flag to specify whether the bot is added to a channel.

In one embodiment, SAS 306 can be coded using the Bolt-JS framework from Slack and NodeJS. Other embodiments can be coded in ELIXIR.

2.3.2 Assistant Service

Figure 4A:
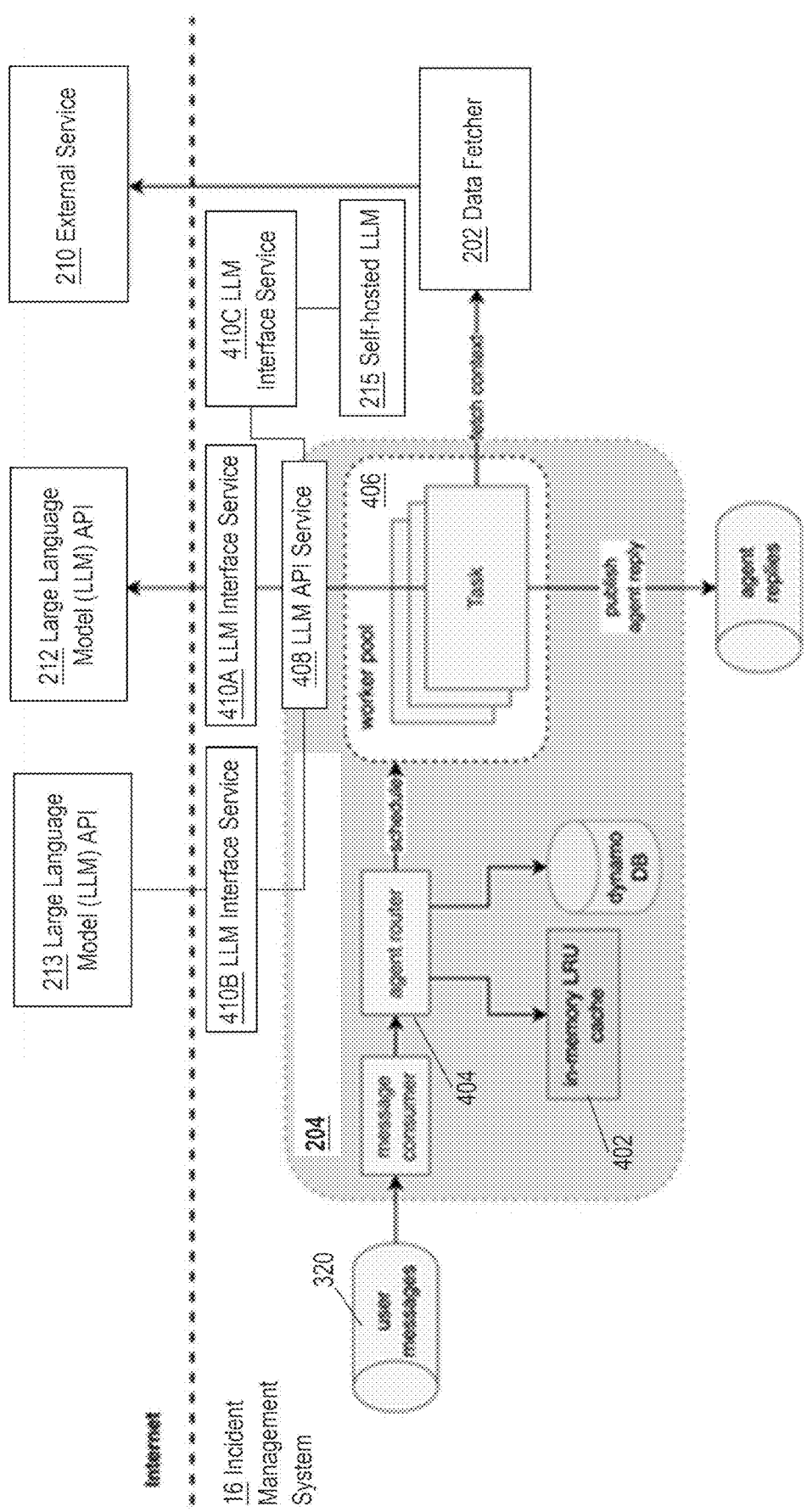
FIG. 4A illustrates an example assistant service that can be used in the system of FIG. 2 in one embodiment.

FIG. 4A illustrates an example assistant service that can be used in the system of FIG. 2 in one embodiment. In one embodiment, the assistant service 204 implements a chatbot powered by an LLM in which one of the stakeholder computers 106 transmits a question, and the assistant service replies to the question using previous chat history as context. In one embodiment, assistant service 204 is programmed using PRR (Prompt-Router-Reply) agents that split the problem of answering a user prompt into two discrete steps. In the first step, based on the user prompt, the assistant service 204 is programmed to decide what task the user is referring to. In the second step, the assistant service 204 uses a task-specific module to reply to the user.

Figure 4B:
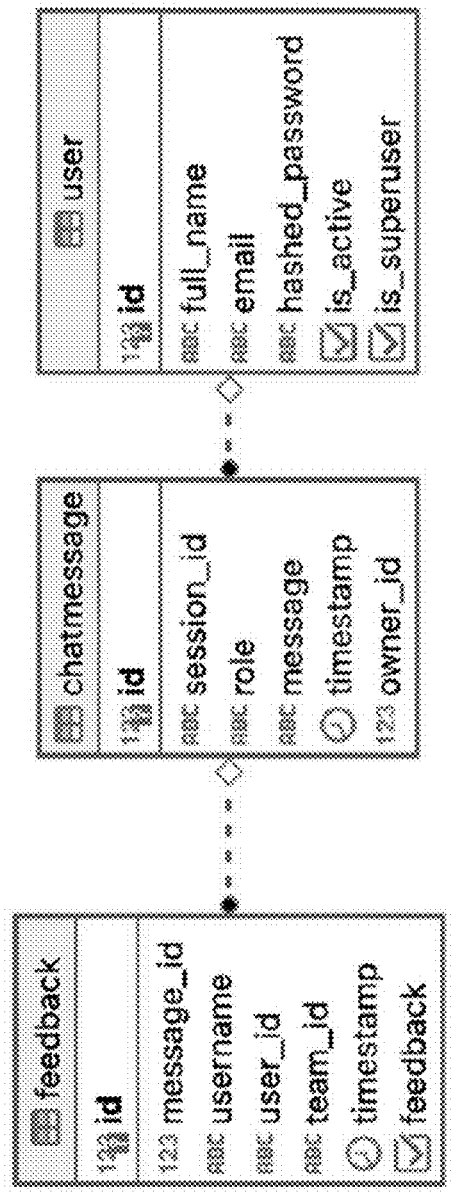
FIG. 4B illustrates an example relationship of basic data tables for storing user transaction data.

In one embodiment, assistant service 204 is programmed to consume user messages and feedback events from the message bus or event streaming service. In one embodiment, assistant service 204 is programmed to store each transaction with the service in storage instance 22, along with the participant role (user or system). FIG. 4B illustrates an example relationship of basic data tables for storing user transaction data. In one embodiment, a session identifier or "session id," which is abbreviated in FIG. 4B as "id," serves as a partition key for stored data, which allows scaling data usage almost indefinitely by causing the database to shard the data based on the session_id. Further, session_id values enable passing all information needed to the LLM per request since LLMs are stateless. In an embodiment, the schema of FIG. 4B comprises a feedback object, a chatmessage object, and a user object, each having a unique identifier; some embodiments can omit storing user-related data via the user object. Each object can correspond to the column structure of a row in a relational database table. The feedback object comprises a message_id, username, user_id, team_id, timestamp, and feedback content. The message_id value references a chatmessage object, which comprises a session_id, role, message, timestamp, and owner_id. The owner_id value of the chatmessage object and the user_id value of the feedback object can point to a user object.

The assistant service 204 can be coded in PYTHON. In one embodiment, assistant service 204 is programmed to use Postgres or DynamoDB to store state data in storage instance 22. Storage can include chat messages and feedback information, which can be treated as immutable, append-only data like a ledger. With DynamoDB, read/write limits can be provisioned per partition; by using a high-cardinality partition key, the maximum provisioned read/write throughput per session can be used.

In one embodiment, assistant service 204 is programmed to send each user prompt represented in user messages 320 to the LLM API 212 with a corresponding session chat history. In one alternative, a task worker or thread of worker pool 406 can directly call the LLM API 212. Additionally or alternatively, task workers or threads from worker pool 406 transmit requests or calls for the service of an LLM to an LLM API service 408, which is programmed to determine, based on an actions specified in the requests or calls, which LLM from among a plurality of LLMs to select to process the actions. For example, LLM API service 408 is communicatively coupled to a plurality of LLM interface services 410A, 410B, 410C. Each of the LLM interface services 410A, 410B, 410C is communicatively coupled respectively to the LLM API 212, another external or third-party LLM API 213, or to a self-hosted LLM 215 within the incident management system 16. The decision logic of the LLM API service 408 can be based upon factors such as required or desired response time from an LLM API, the cost of calling a particular API, the maximum numbers of tokens that a particular LLM API allows in a prompt, response, or combination of prompt and response, how a particular LLM API limits or throttles inbound requests. The decision logic also can be based on the substantive nature of the action in a particular request or call; for example, if a request seeks internal context that is available only based upon internally maintained, privately curated training data, then LLM API service 408 could route a request to the self-hosted LLM 215.

In one embodiment, assistant service 204 is programmed to maintain an in-memory LRU cache 402 to avoid fetching the session context from the storage instance 22 for every user event. In one embodiment, assistant service 204 is programmed to manage the chat history per session. That is, each channel is assigned a session identifier comprising a team identifier and an incident identifier, and conversations are stored in the database and in cache 402 using the session identifier as the primary key.

Figure 4C:
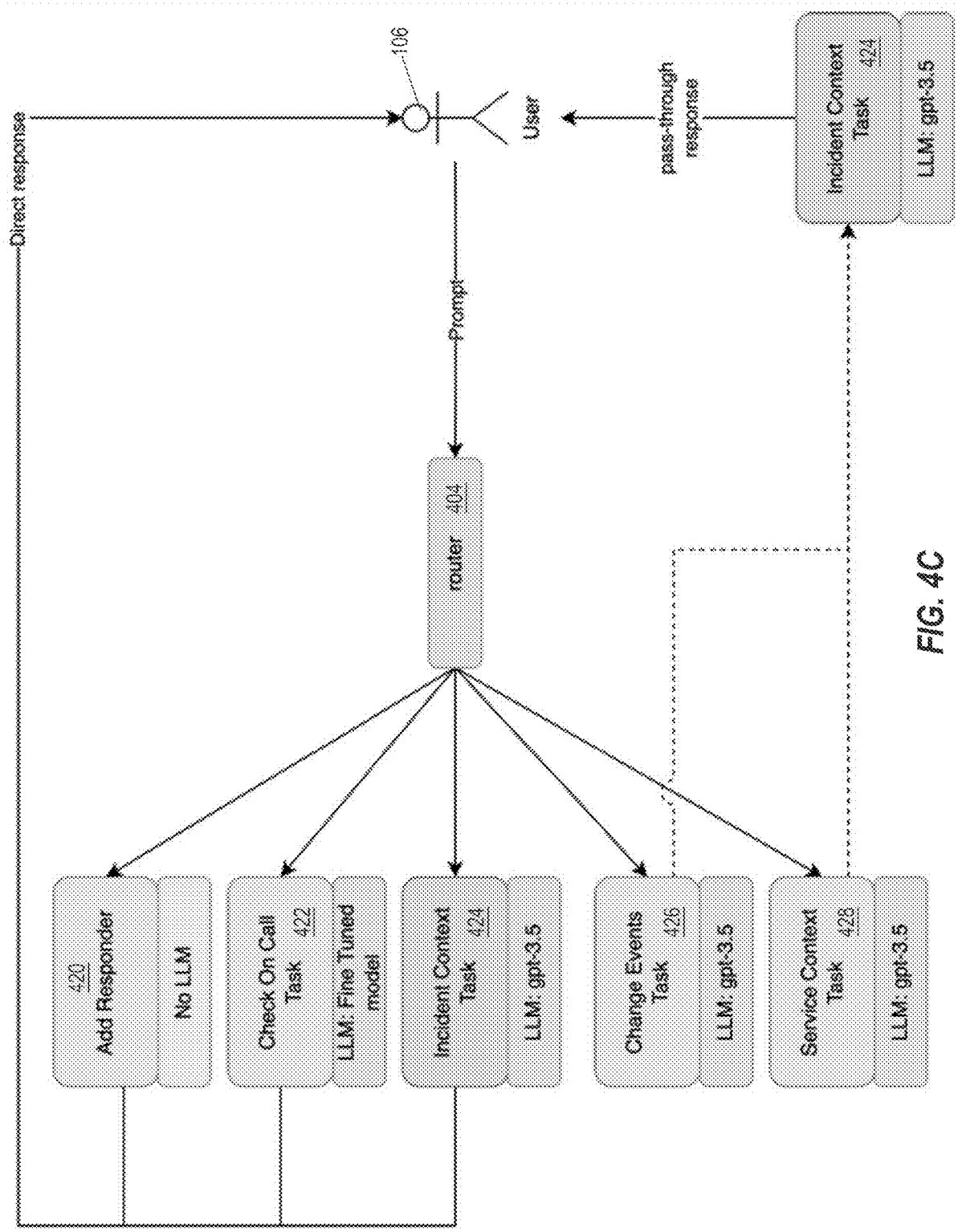
FIG. 4C illustrates a data flow among functional elements to implement task routing in the assistant service.

In one embodiment, assistant service 204 is programmed to send user messages 320 to an agent router 404, which is programmed to determine which task the user prompt refers to. FIG. 4C illustrates a data flow among functional elements to implement task routing in the assistant service. Examples of tasks include: Add responder task 420; Check on-call task 422; Incident context task 424; Change events task 426; Service context task 428. Other examples of tasks include providing general information about the incident context, checking if there have been any changes in the service in the past N days, checking if any related services are experiencing issues, using a monitoring API to answer questions, and using a support case API.

Generally, the assistant service 204 is programmed analyze and diagnose large sets of information, and provide an incident summary, context, and customer impact in real-time or near real-time. The assistant service 204 can seamlessly integrate the features of various applications of incident management system 16, or federated systems related to it, to diagnose the issue by inspecting recent changes, errors, service dependencies, and past incidents and providing an ordered list of causes of the incident. This list can be ordered by the most probable cause and each tuple can have an associated remediation action. In one approach, once the cause of the incident is confirmed, manually or automatically, the automated remediation action can take place; in other embodiments, the assistant service 204 is programmed to automatically initiate or apply the automated remediation action for the most probable cause in the list.

The assistant service 204 can react to a prompt from the user or act based on an event. For example, if a high-priority incident is triggered, assistant service 204 can immediately start fetching relevant information without waiting for a responder to enter a request or prompt. The assistant service 204 can also actively provide information to responders based on real-time changes to the incident context and/or by leveraging historical information such as post-mortem reports from previous incidents, and correlating what information or resolution actions could be useful to the ongoing incident. Examples of real-time changes to the incident context include another service failed, customer tickets were received in the meantime, and similar events.

In an embodiment, assistant service 204 is programmed to provide:

- Summarization of what is happening
- Identification of what has changed in a given time frame (e.g. last 2 days)
- Identification of incident triggers and contributing factors
- Specify the customer impact and provide access to customer input from internal customer support systems or social media
- Generate and issue status updates to different stakeholders
- Generate scripts to mitigate or resolve the incident
- Run a pre-built script to diagnose, mitigate, or resolve the incident
- Dynamically display information, suggestions, and recommendations based on past and related incidents and their respective metadata or post-mortems In one embodiment, examples of tasks, prompts, and programmed actions include:

| TASK | PROMPT EXAMPLE | ACTION EXAMPLE |
| --- | --- | --- |
| Check on-call | @AI, who is on call for OWT? | Fetch service names using data fetcher 202; verify that the name provided is aligned with an existing name |
| Add responder | @AI, add @JaneDoe as a responder | Use a mapping table to map SLACK user identifiers to user accounts in the incident management system 16 |
| Service context | @AI, is there anything wrong with the OWT service? | Fetch service names using data fetcher 202; verify that the name provided is aligned with an existing name |

Not all tasks will require the use of LLM capability; for example, the "Add responder" task 420 could be addressed by generating and transmitting a programmatic call to the general API 504 of the incident management system 16 formatted to add a responder to a specified incident. Similarly, the "Check on-call task" 422 could invoke a fine-tuned machine-learning model but not an LLM via the LLM API 212. Furthermore, as seen in FIG. 4C, assistant service 204 can be programmed for a direct response mode of operation and a pass-through mode of operation. In the direct response mode of operation, the user sends a prompt, assistant service 204 routes the prompt to the appropriate task, and code implementing the task worker produces a result string that the assistant service returns directly to the user. In the pass-through mode of operation, after routing the user prompt to a task worker, the assistant service 204 is programmed to return the result to a task worker thread for the incident context task 424, which is programmed to obtain the output of the first task worker, inject the output into an overall incident context prompt including data from all previous interactions, and produce a response based on the joined data.

In one embodiment, router 404 can be programmed using logit biasing to detect follow-up questions from stakeholder computers 106 and an LLM to classify follow-up questions for differentiated routing. Further, router 404 can be programmed to implement a default task or default option as an escape route. For example, when router 404 determines that no reference alignment embeddings are suitable to classify a user prompt as matching an existing task, the router can be programmed to invoke a default or catch-all task in worker pool 406. A cutoff threshold can be determined based on, in effect, a signal-to-noise ratio of the measured embeddings distances. Alternatively, an LLM-powered router can be used.

The inventors have recognized, in an inventive moment, that the foregoing approach offers numerous practical benefits. Few-shot learning and task-specific context data improve the chances that the LLM API 212 will reply correctly and should increase the likelihood that smaller and simpler LLMs will produce good results. Next, the approach allows scaling the operation of the system to a large number of tasks or capabilities, without exceeding the maximum number of tokens allowed in a prompt to the LLM API 212 when a public, open LLM is used. For example, ChatGPT 3.5 has a limit of 16,384 tokens in the combination of a prompt and a response. The approach also allows the use of different LLMs for different tasks, enabling optimizing the selection of a machine-learning model for the task represented in the prompt. Different fine-tuned machine-learning models can be used for task-specific contexts. Finally, the foregoing design approach enables dividing human code development work and data science research among multiple teams whose work can be integrated after completion.

In one embodiment, assistant service 204 is programmed to accept the registration of different tasks using a plugin system, where task developers define the implementation of the task and a descriptor that will be used to match the user prompt and the task. In one embodiment, assistant service 204 is programmed to use semantic similarity algorithms or a second machine learning model to match or classify a task based on the input and the task descriptor.

In one embodiment, assistant service 204 is programmed to schedule the prompt to a task-specific worker thread of task pool 406 after selecting the appropriate task. Each task-specific worker thread implements the following general logic, with modifications depending on the nature of the task. Each user prompt represented in user messages 320 is injected into a predefined chat prompt, along with incident context information and other relevant data. An example of a predefined chat prompt is shown in TABLE 1.

TABLE 1

| EXAMPLE CHAT PROMPT |
| --- |
| System: You are a helpful assistant trained to help in incident response situations.<br>Context: An incident on service S occurred at time T on date D. It was triggered by {trigger_message} and declared as a {urgency} urgency incident. |

TABLE 1-continued

EXAMPLE CHAT PROMPT

Service S depends on services Y and Z. They are both OK.
Service S depends on external third-party services A, B, and C. Service C has an outage.
The incident is tracked in a chat channel. This is the conversation so far:
[[CHAT SUMMARY]]
Previous conversation with user: [[chat_history]]
There have been changes to the service in the last K days: [[Summary of changes]]
Based on the given context, answer the following question: [[User input]]

In an embodiment, task worker threads of the worker pool 406 are programmed to determine an optimal set of data to provide given an incident context. "Optimal," in this context, can mean excluding data concerning related incidents if no such incidents exist. The task worker threads can also be programmed to suggest relevant information and, overall, provide enough context information for calls to LLM API 212 to facilitate useful, well-structured responses. Incident context information can be derived from available data that addresses what steps a responder would take to investigate the incident, how to grade the extent or severity of the incident, how to grade the expected customer impact, how to mitigate the incident, and how to resolve the incident. Example context data can include incident title, trigger source, trigger custom details such as a stack trace obtained from a tracing service like BUGSNAG, service description, a markdown of service operations guidelines obtained by using available incident context data as input for a semantic search of operational guidelines of a service; log records; monitoring dashboard values; change events; similar incidents; incidents in related services; a code diff derived from the change events; and customer impact data derived from sources of open cases.

LLM inference calls to LLM API 212 can take several seconds to finish. Therefore, in an embodiment, assistant service 204 is programmed to use asynchronous communication between the SAS 306 and assistant service 204. Asynchronous communications reduce space and time coupling between the services and improve system consistency. In one embodiment, assistant service 204 is programmed to use the event streaming service to publish a task scheduling event, which the worker pool 406 consumes, processes, and produces responses.

In one embodiment, assistant service 204 is programmed using PYTHON and the FASTAPI high-performance Python web service framework to leverage existing libraries for chatbot functions such as langchain and semantic similarity as well as production requirements such as data validation and API documentation. For example, the langchain library can be used to create the required prompts using patterns such as MRKL, ReAct, Few-Shot learning, and Tool usage. The assistant service 204 can be deployed using multiple instances with a container orchestration system such as KUBERNETES or DOCKER with a load balancer to provide fault tolerance for local, transient errors. Another embodiment could use ELIXIR as the coding language. In one embodiment, assistant service 204 is programmed to use the OPENAI API as the LLM API 212, subject to appropriate security controls if private data relating to the computer system 10 must be included in prompts to the LLM; for example, CHATGPT ENTERPRISE, which offers enterprise-grade security and privacy, can be used.

In an embodiment, the LLM of LLM API 212 can be fine-tuned to improve its performance in the incident response domain using both knowledge alignment fine-tuning and task alignment fine-tuning. In one embodiment, fine-tuning can use the following process. First, a copy of a public-trained model is obtained from an open source, the public-trained model having learned how to read and write natural language. Next, supervised fine-tuning is applied to the model using relatively small, 1,000-pair annotated training data, each pair being high-quality and accurate. Annotated training data pairs can consist of a prompt like "<include incident context information here >User: What happened?" paired with a written output specifying a desired response of the model. Reinforcement learning from human feedback can also be applied by creating a preference dataset to construct a reward model. The reward model can further fine-tune the supervised fine-tuned model to follow human preferences.

2.3.3 Data Fetcher

Figure 5:
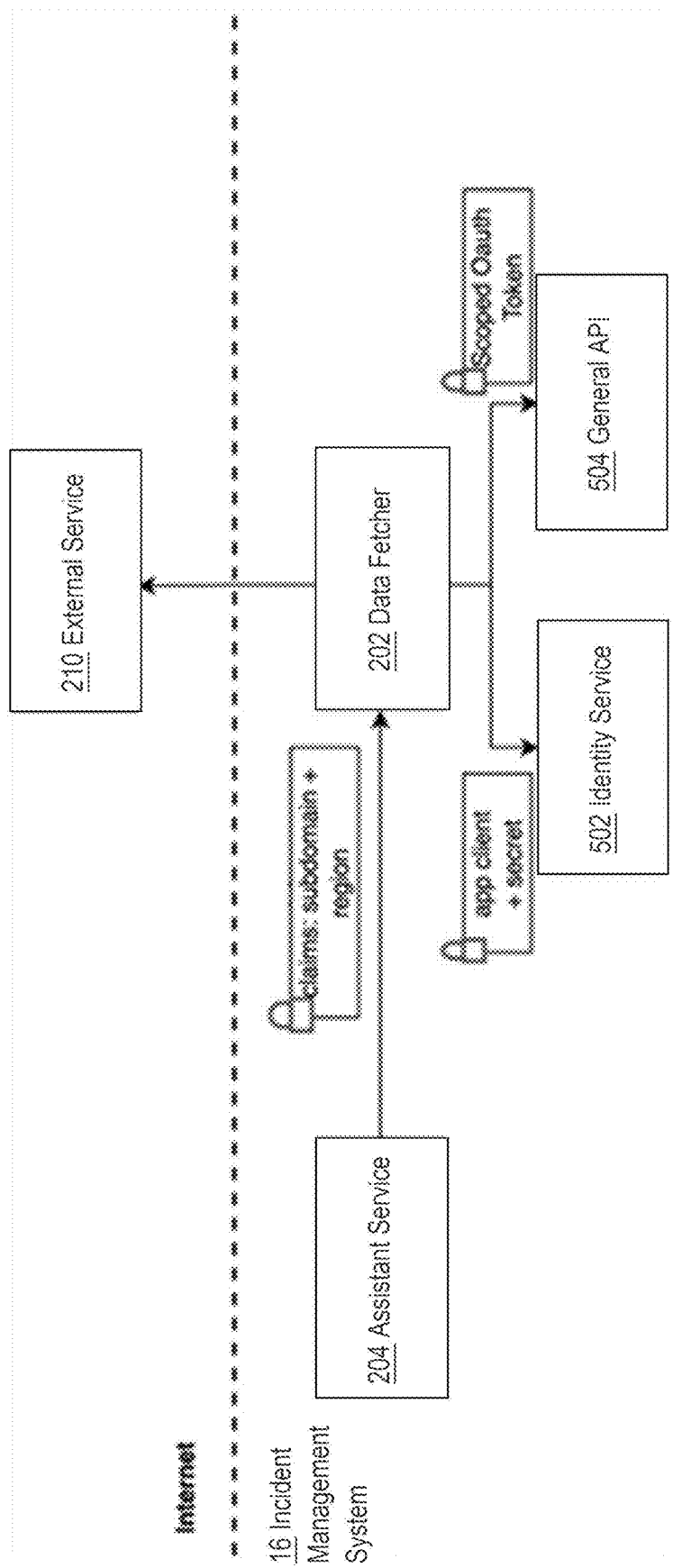
FIG. 5 illustrates an example integration of a data fetcher with other elements of the system of FIG. 2 in one embodiment.

FIG. 5 illustrates an example integration of a data fetcher with other elements of the system of FIG. 2 in one embodiment. The data fetcher 202 acts as an intermediary between the assistant service 204, a general API 504 of the incident management system 16, and any third-party service data the conversational agent 102 may need from external service 210. The primary programmed functions of the data fetcher 202 simplify API integration by exposing a custom, simplified interface while managing the complexities of interacting with other APIs. In an embodiment, assistant service 204 is programmed to use the simplified API to request needed data.

In an embodiment, assistant service 204 is programmed to request data by calling the API of data fetcher 202 and providing, in the request, a JWT token as authentication with a shared secret containing the account subdomain and region as claims; these credentials can be used with other calls to the general API 504. Based on the type of request that the data fetcher 202 receives in an API call, the data fetcher is programmed to retrieve all necessary data from sources within the incident management 16 via the general API 504 or from external services 210 and create an appropriate response. Authentication with the general API 504 can use scoped OAuth protocol messages; using the scoped OAuth credentials, the data fetcher 202 obtains a valid token from an identity service 502 and uses the token as an authorization header when calling the general API. To avoid having each API request cause a request for a new token from the identity service 502, the tokens can be stored in memory for each account for the duration of the validity period associated with each token. Further, in an embodiment, data fetcher 202 does not persist data to storage instance 22. In an embodiment, data fetcher 202 uses an in-memory cache to store OAuth tokens temporarily to avoid each API request resulting in a request for a new token from the identity service.

In an embodiment, data fetcher 202 is coded in ELIXIR since it implements functionality not related to data; the use of ELIXIR can reduce the memory footprint of the data fetcher.

2.4 Code Matching

Figure 6:
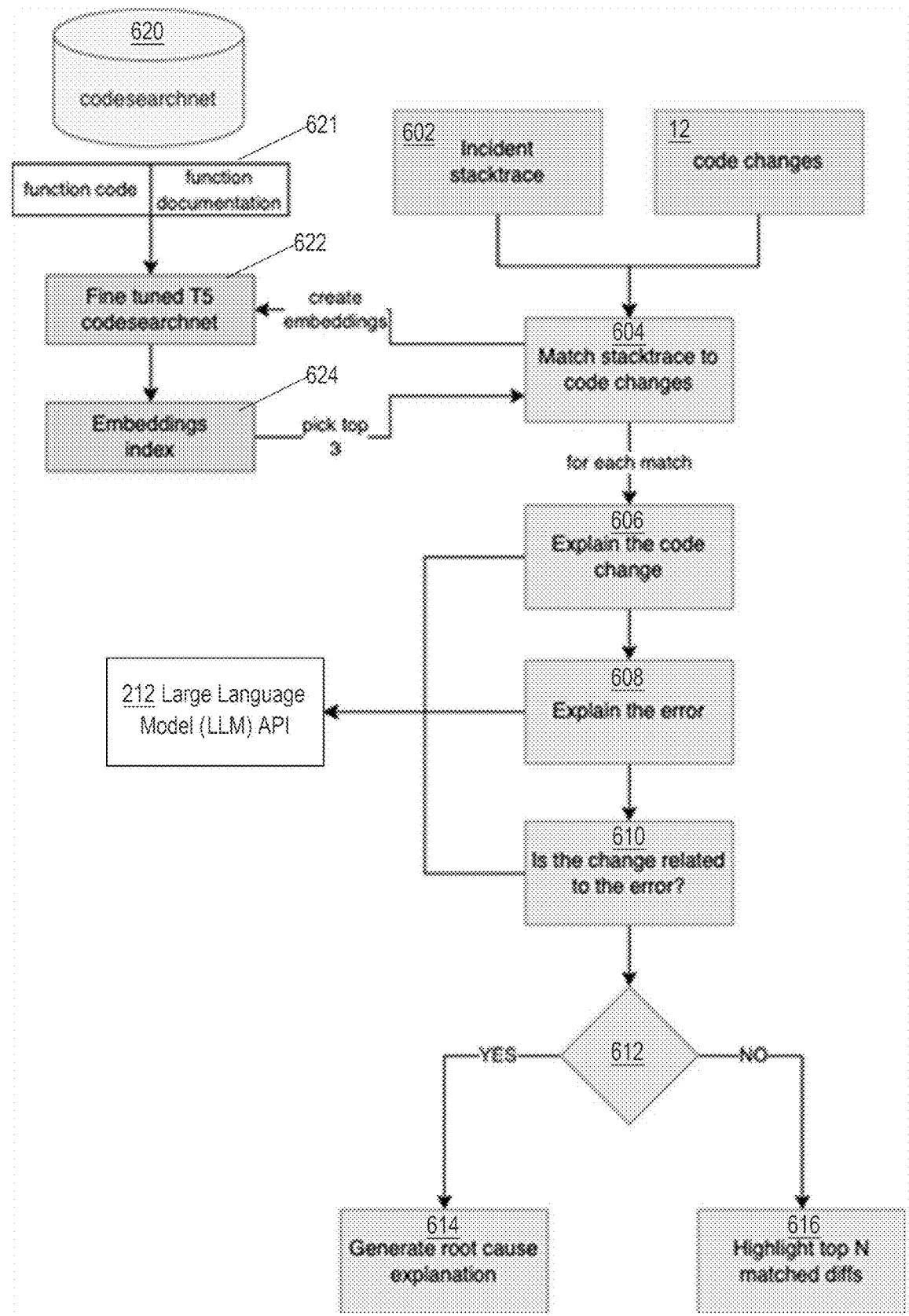
FIG. 6 illustrates a process flow or programmable algorithm that can be implemented in an embodiment to provide automatic remediation of computer incidents.

FIG. 6 illustrates a process flow or programmable algorithm that can be implemented in an embodiment to provide automatic remediation of computer incidents. The process of FIG. 6 can be programmed as part of a task-specific worker of worker pool 406, and a response from that task worker can be published to the incident management instructions (FIG. 1A) to result in storing root cause data 120 and remediation actions 130 in the form of code changes. The root cause data 120 can comprise a root-cause explanation of an error message or incident. The remediation actions 130 can comprise configuration changes, code changes, or other changes which, if applied to computer system 10, should remediate the error represented in the error message or remediate the incident.

Generally, FIG. 6 provides a programmable solution for expediting the resolution of an incident by identifying code changes to the affected service and using large language models to determine if the reported error is likely related to the code changes, thus mapping errors to code. In an embodiment, FIG. 6 is programmed in part to describe code changes from a diff, describe an error from a stack trace service, and determine if changes are likely the root cause of the error. In some cases, root cause determination can use data obtained from the two descriptive steps using chain-of-thought prompting.

In an embodiment, the process of FIG. 6 initiates when an incident stack trace 602 and code changes 12 are received at, or obtained by, block 604 of a task worker executing in association with assistant service 204. At block 604, the stack trace is matched or mapped to the code changes. In some embodiments, block 604 can be programmed to fetch code changes 12 or other change events via calls to the general API 504 and enrich these events with code diffs via calls to an API of a code repository such as GITHUB or BITBUCKET. Events can be fetched using a time range between (a) the timestamp value of a given incident and (b) the last N hours before the incident. Log messages can be used in some embodiments to enrich events based on an anomaly detection filter that can detect and isolate the relevant error message logs from all available logs. A log-based approach may be useful for certain failures that do not result in a stack trace, such as crashloop errors, mandating extraction of a fault signal from log entries. In one embodiment, block 604 can further comprise translating the error to a natural language representation before comparing with the code changes.

In an embodiment, an embedding model to filter top candidates for analysis facilitates the execution of block 604. In various embodiments, a transformer-based architecture or a neural network can be used. In an embodiment, a T5 encoder 622, comprising the encoder(s) of a T5 Transformer-based machine-learning model, is trained on the CODESEARCHNET dataset 620, which comprises function code and function documentation 621. The CODESEARCHNET dataset 620 is commercially available from MICROSOFT and comprises two million pairs of items of function code and function documentation 621 that can be used to train an encoder to perform a semantic search. In other embodiments, smaller training datasets of high-quality pairs of values can be used. For example, in one experimental implementation, a Transformer-based machine-learning model was trained using a training data set comprising at least 1,000 pairs of function code and function documentation via supervised learning and curated annotation of the data.

Code changes 12 from block 604 are received at the encoder 622 as input to create embeddings. Executing an inference stage of the T5 Transformer-based machine-learning model produces an embeddings index 624. The process can be programmed for selecting, from the embeddings index, a top-N set of code changes as the one or more particular code changes from among the set of one or more candidate code changes. For example, the top three candidates, in one embodiment, are returned to block 604 for matching. In various embodiments, the embeddings can be computed directly on the error message or over a textual description of the error obtained from an LLM.

In some embodiments, block 604 can be programmed to chunk the change events, with each chunk among a plurality of chunks of change events comprising from one change event per chunk up to all the change events in a single chunk. Each chunk is then processed at block 604 to determine if a match to a stack trace exists. For each match, the process of block 606 to 616 inclusive executes.

At block 606, for a particular match, the process is programmed to generate a prompt to LLM API 212 to explain the code change. At block 608, for a particular match, the process is programmed to generate a prompt to LLM API 212 to explain the error represented in the stack trade or enriched values. And, at block 610, for a particular match, the process is programmed to generate a prompt to LLM API 212 to state whether the change is related to the error. For example, the prompt could ask the LLM if a particular code diff could be the cause of the stack trace, with the stack trace being injected into the prompt as context data. Block 606, block 608, and block 610 each can generate different responses that can be inspected to determine whether a root cause explanation is present in the response.

If a root cause explanation is present, as tested at block 612, then at block 614, the process is programmed to generate a root cause explanation. In one embodiment, block 614 is skipped if the response indicates that the LLM could not clearly relate the error and the change. In this case, or if a root cause is not present in the response, then at block 616, the process is programmed to highlight the top N matched diffs to facilitate human inspection, by a responder, of the code. In one approach, a semantic search algorithm can be used to rank the changes using cosine distance and present the ranked changes in a visual display. For example, the task worker of worker pool 406 can be programmed to return a response that is formatted in HTML that the incident management instructions 100 can transmit to stakeholder computers 106 for visual display in a graphical user interface.

Embodiments using the foregoing approaches are effective in processing a variety of different incidents that have stack trace error information. The following are non-exclusive examples to illustrate the inputs and outputs that can occur in an implementation.

Incident Stack trace:
lib/webhooks_consumer/broadway.ex: 73—
IntegrationService.WebhooksConsumer.
   Broadway.handle_data/3

Output from an "Explain the Error" prompt:
The error occurred in the file "lib/webhooks_consumer/
   broadway.ex" at line 73, specifically in the function
   "IntegrationService.WebhooksConsumer.
   Broadway.handle_data/3". The error message does not
   provide specific details about the nature of the error, but it suggests that there was an issue with handling data in the webhooks consumer module.

Incident Stack trace:
lib/webhook_transformer/webhook transformer.ex:15—SlackService.WebhookTransformer.to_blocks_card (&SlackService.WebhookTransformer.Event agent: % SlackService.WebhookTransformer.Event.Agent{id: "PJ6S9GP", name: "system-jira", type: "user reference", url: "https://cloudera-sre.pagerduty.com/users/PJ6S9GP"}, client: nil, event_type: "annotated", incident: % {asignees: [ ], conference bridge: nil, escalation_policy: {id: "PG2VE60", name: "SRE", url: "https://cloudera-sre.pagerduty.com/escalation_policies/PG2VE60"}, id: "Q3EGIKY8KMVDQS", number: 12710, priority: % {id: "PHP2FA4", name: "P2"}, resolve_reason: nil, service: & {id: "P40JBZK", name: "SRE High Priority", url: "https://cloudera-sre.pagerduty.com/service-directory/P40JBZK"}, status: "resolved", teams: [% {html_url: "https://cloudera-sre.pagerduty.com/teams/P60ZB4G", id: "P60ZB4G", self: "https://api.pagerduty.com/teams/P60ZB4G", summary: "SRE", type: "team_reference"}], title: "SREOPS-7088: Unable to create or update lambdas with code pointing to ECR", urgency: "high", url: "https: . . . .

Output from an "Explain the Error" prompt:
The error occurred in the file "webhook_transformer.ex" at line 15. It seems to be related to the transformation of a webhook event into blocks card format for SlackService. The error message suggests that there is an issue with converting the data structure of the event, specifically with the "to_blocks_card" function. The error message provides a detailed stack trace and includes information about the event and its properties.

Example of a prompt used to generate an error explanation:

```
'''
{{#user~}}
    consider the following application stack trace:
    {{stacktrace}}
    based on this error context, try to describe what the
        affected code does in a single paragraph.
{{~/user}}
{{#assistant~}}
    {{gen "error_explanation" temperature=0 max tokens=100}}
{{~/assistant}
'''
```

The following examples show the change events corresponding to the incidents shown above, subject to the following constraints. First, in some cases, the recent change events with code diff contained thousands of lines; to improve accuracy and to conform to LLM prompt token maximum limits, in an experiment, the code changes were divided into chunks with no more than 5000 characters. Second, the filter described above used textual similarity (text embedding and a cosine similarity score) to define which pair of incident error and code diff chunks to consider as a potential root cause, thereby significantly reducing the number of calls to the LLM.

The first examples show two chunks of code changes that occurred less than 48 hours before each of the incidents above. The first change occurred before the first incident, and the second change occurred before the second incident.

Code Changes (Diff)—corresponds to the first incident above:

```
@@ -10,7 +10,7 @@ defmodule
Elixir.IntegrationService.Actions.Integration.AccountsMappings do
    {limit, _} = Integer.parse(params["limit"] || "25")
    limit_plus_1 = limit + 1
-    ams = AccountsMappings.get_accounts_mappings (jca_id, offset, limit_plus_1)
+    ams = AccountsMappings.list(jca_id, offset, limit_plus_1)
    {: OK,
        %{
```

Output from an "Explain the Code Changes" prompt:
The code change replaces the function call "AccountsMappings.get_accounts_mappings" with "AccountsMappings.list" in the file "lib/webhooks_consumer/broadway.ex" at line 10.

Code Changes (Diff)—corresponds to the second incident above:

```
@@ -1,187 +0,0 @@
-defmodule SlackService.WebhookTransformerToShortCardTest do
-    import SlackService.WebhookTransformer.PayloadHelpers
-    alias SlackService.WebhookTransformer
-    alias SlackService.WebhookTransformer.Event
-    use ExUnit.Case
-
-    @slack_data %{
-        workspace: "workspace_name",
-        channel: "channel_name",
-        ts: "1604593722001100",
-        users: %{ }
-    }
-
-    @obf_account_id "PH63AO9"
-    @primary_incident_channel_data [
-        % {
-            channel_name: "channel_name",
-            channel_id: "channel_id",
-            slack_team_id: "slack_team_id"
-        }
-    ]
-
-    test "should return proper slack short attachments for the acknowledged incident" do
-        result_attachments =
-            incident_event("acknowledged")
-            |> Event.parse! ( )
-            |> WebhookTransformer.to_short_card(@slack_data, obf_account_id: @obf_account_id)
-
-        assert result_attachments ==
-    load_short_attachments("acknowledged")
-    end
-
-    test "should return proper slack short attachments for the acknowledged incident when the agent is inbound integration" do
-        result_attachments =
-            incident_event("acknowledged", agent_type: "inbound_integration_reference")
-            |> Event . parse ! ( )
-            |> WebhookTransformer.to_short_card(@slack_data, obf_account_id: @obf_account_id)
-
-        assert result_attachments ==
-    load_short_attachments("acknowledged_by_inbound_integration")
-    end
-
-    test "should return proper slack short attachments for the resolved incident" do
-        result_attachments =
-            incident_event("resolved")
-            |> Event.parse! ( )
```

```
       |> WebhookTransformer.to_short_card(@slack_data,
obf_account_id: @obf_account_id)
-
-      assert result_attachments ==
load_short_attachments("resolved")
-    end
-
-    test "should return proper slack short attachments for
resolved be merge incident" do
-      result_attachments =
-        incident_event("resolved", merged: true)
-        |> Event.parse! ( )
-        |> WebhookTransformer.to_short_card(@slack_data,
obf_account_id: @obf_account_id)
-
-      assert result_attachments ==
load_short_attachments("resolved_merged")
-    end
-
-    test "should return proper slack short attachments for
unacknowledged incident" do
-      result_attachments =
-        incident_event("unacknowledged")
-        |> Event.parse! ( )
-        |> WebhookTransformer.to_short_card(@slack_data,
obf_account_id: @obf_account_id)
-
-      assert result_attachments ==
load_short_attachments("unacknowledged")
-    end
-
-    test "should return proper slack short attachments for the
delegated incident" do
-      result_attachments =
-        incident_event("delegated")
-        |> Event.parse! ( )
-        |> WebhookTransformer.to_short_card(@slack_data,
obf_account_id: @obf_account_id)
-
-      assert result_attachments ==
load_short_attachments("delegated")
-    end
-    test "should return proper slack short attachments for the
delegated incident when notification_disabled setting is enabled"
do
-      result_attachments =
-        incident_event("delegated")
-        |> Event.parse! ( )
-        |> WebhookTransformer.to_short_card(@slack_data,
-           obf_account_id: @obf_account_id,
-           primary_incident_channel_data:
@primary_incident_channel_data
-        )
-
-      assert result_attachments ==
load_short_attachments("delegated_with_block_message")
-    end
-
-    test "should return proper slack short attachments for the
escalated incident" do
-      result_attachments =
-        incident_event("escalated")
-        |> Event.parse! ( )
-        |> WebhookTransformer.to_short_card(@slack_data,
obf_account_id: @obf_account_id)
-
-      assert result_attachments ==
load_short_attachments("escalated")
-    end
-
-    test "should return proper slack short attachments for the
reassigned incident" do
-      result_attachments =
-        incident_event("reassigned")
-        |> Event.parse! ( )
-        |> WebhookTransformer.to_short_card(@slack_data,
obf_account_id: @obf_account_id)
-
-      assert result_attachments ==
load_short_attachments("reassigned")
-    end
-
-    test "should return proper slack short attachments for the
annotated incident" do
-      result_attachments =
-        incident_note_event( )
-        |> Event.parse! (derive_from: i
```

Output from an "Explain the Code Changes" prompt:

The code changes involve the removal of a test module called
"SlackService.WebhookTransformerToShortCardTest"
and all its associated tests.

The module was responsible for testing the generation of Slack short attachments for different incident events. The removed tests covered scenarios such as acknowledged, resolved, delegated, escalated, and reassigned incidents.

Example of a "Explain the Code Changes" prompt:

```
{{#user~}}
consider the following code changes:
   {{code changes}}
based on those code changes, try to describe what the
   new code does in a single paragraph.
{{~/user}}
{{#assistant~}}
   {{gen "code_changes_explanation" temperature=0
      max tokens=300}}
{{~/assistant}}
```

The final examples show explanations and prompts concerning whether a code change could be the root cause of an error. This classification considers whether a code change could originate the incident or not, along with the exemption for the decision. The first example corresponds to the first incident and the first code change, and the second example corresponds to the second incident and the second code change.

1. The code change could be the root cause of this error. Explanation:

The error occurred in the file "lib/webhooks_consumer/broadway.ex" at line 73, specifically in the function "IntegrationService.WebhooksConsumer.Broadway.handle_data/3". The error message does not provide specific details about the nature of the error, but it suggests that there was an issue with handling data in the webhooks consumer module. The error could have been caused by the code changes made in the mentioned code snippet, where the function call "AccountsMappings.get_accounts_mappings" was replaced with "AccountsMappings.list" in the file "lib/webhooks_consumer/broadway.ex" at line 10. This change might have caused the error because the function "list" might have a different implementation or behavior compared to the previous function "get_accounts_mappings". This difference in behavior could have led to an error in the handling of data in the webhooks consumer.

2. The code change is NOT the root cause of this error.

The following shows the first version of the prompt used to generate the error explanation:

```
{{#user~}}
    consider the following code changes:
    {{code_changes}}
    now consider the following stacktrace:
    {{stacktrace}}
    Could the error have been caused by the code change?
       explain your answer
{{~/user}}
{{#assistant~}}
    {{select 'root_cause' options=valid_responses}}
{{~/assistant}}
```

The following shows a second version of the prompt used to generate the error explanation. The second version allows a "maybe" option as a response to whether the code change could be the root cause of the incident.

```
{{#system~}}
You are a system trained to parse code changes and
    determine if they caused a given error
{{~/system}}
{{#user~}}
Consider the following error:
{{error_message}}
explain what could have caused this error, what function-
    ality is affected, and what file class and function it
    happened on.
Respond in a single paragraph.
{{~/user}}
{{#assistant~}}
{{gen "error_explanation" temperature=0 max_to-
    kens=200}}
{{~/assistant}}
{{#user~}}
now consider the following code changes:
{{code_changes}}
Could they have been the cause of the error?
Reply with YES, NO, or MAYBE.
If you believe the error directly relates to a code change,
    answer YES. An example would be if a code change
    changes a function name and the error shows that
    someone is still calling the old name of the function.
If there are changes in the same file, class, or function that
    caused the error, answer with MAYBE.
If the functionality changed and the functionality affected
    in the error is unrelated, answer with NO.
{{~/user}}
{{#assistant~}}
{{select 'root_cause' options=valid_responses}}
{{~/assistant}}
{{#user~}}
explain your response in one paragraph
{{~/user}}
{{#assistant~}}
{{gen "root cause explanation" temperature=0 max
    tokens=200}}
{{~/assistant}}
```

2.5 Other Generative AI Integrations

In an embodiment, generative artificial intelligence systems can be used in intermediary steps of the previously described techniques. For example, the following process can be programmed.

1. An event or incident is received, represented in event or incident data.

2. The event or incident data and related data such as recent code changes are prepared as context and transmitted to a generative AI system with a prompt to summarize the issue represented in all the context data.

3. A first response from the generative AI system is received. The first response is then submitted to the generative AI system again with a prompt to create an automation job that provides diagnostics to prove or disprove the event summary that was previously received as the first response.

4. A second response, comprising an automation job, is received from the generative AI system. The automation job is submitted to an appropriate automation execution system and executed against the target system. A third response from the target system and/or the automation execution system is received.

5. If the response proves that the first response was correct, then the first response and the third response are submitted together to the generative AI system, with a prompt that asks the AI system, given all the information in the first response and the third response, what is the fix for the original issue? The subsequent response from the generative AI system can be presented to the user or even automatically applied as a code correction to the target system.

In this manner, the process writes a script to address an issue, and also dynamically generates a unique combination of a workflow model and an infrastructure model to diagnose and take action at step 4 and validate the result at step 5.

In another embodiment, data obtained from post-mortem analysis of resolved issues can be used with generative AI systems to support the analysis of a current issue before it is resolved. This approach can be useful to guard against the possibility that the questions presented to a generative AI system, such as in the process of FIG. 2 or FIG. 4A, are incorrect. In an embodiment, workers of worker pool 406, or tasks of FIG. 4C, can be programmed to implement the following process.

1. Inspect and search stored post-mortem data to understand what types of questions were asked or answered and that were helpful to resolving a prior similar issue.

2. Show each question to a responder and ask whether a response to the same question would be helpful to know in real time during the incident.

3. Select a handful of questions to show for all incidents and receive user input specifying a positive or negative approval or disapproval of each question, the user input serving as labels or signals to bias a prompt to the generative AI system.

4. Add a section to each incident of the other question and submit the enriched question to the generative AI system to answer.

5. Using the data from step 3 and step 4, instantiate and train a neural network on events, thereby forming a trained ML model capable of outputting the ideal set of questions for a given event. In this manner, each event could have a unique set of questions. The questions comprising the output of this neural network then are used in the previously described approaches of FIG. 2, FIG. 4A, FIG. 4C, etc. as the prompts to the generative AI systems or LLMs.

In an embodiment, step 1 can be implemented by searching the stored post-mortem data to identify five "Why?" questions. For example, the Why? questions can comprise: Why did the service go offline? (Because memory was exhausted.) Why was memory exhausted? (Because of a bad roll out of errant code.) Why wasn't the code tested in pre-production? (It was but we did not have a use case for this particular issue.) Why didn't we have a use case for this particular issue? (It was missed in design.) Why was it missed in design? (Because we don't look at testing in design.)

For post-mortems that have fewer or less clear questions and answers, an embodiment can be programmed to submit a prompt to an LLM of the form "What were the questions asked during the retro?" An embodiment also can be programmed to retrieve stored status updates and prompt an LLM to generate a first pass set of questions.

An example prompt to an LLM can be: "As a developer who has to own fixing this code such that this does not occur again as well as making sure this type of issue is not present in other areas of the code, what questions should I be asking in writing a post-mortem for the following issue: At 10:52 pm Sunday UTC, multiple services on GitHub.com were affected by a network partition and subsequent database failure resulting in inconsistent information being presented on our website."

In response, the LLM might provide the following: "In writing a post-mortem for the described issue, you should ask the following questions:
1. Root Cause Analysis: What caused the network partition and subsequent database failure? Were they related, or were they separate incidents?
2. System Dependencies: Which services were affected, and how are they interconnected? Were there any critical dependencies that contributed to the issue?
3. Failure Points: Were there any specific components in the affected services that failed? What were the reasons for these failures?
4. Recovery Mechanisms: Did the system have adequate recovery mechanisms in place for handling network partitions and database failures? If yes, why did they fail to prevent the inconsistency?
5. Monitoring and Alerts: Were there any monitoring and alerting mechanisms in place for detecting network and database issues? How effective were they?
6. Response Time: How quickly did the team detect the problem, and what was the initial response time to mitigate the issue?
7. Communication and Collaboration: How was communication handled within the team during the incident? Were there any challenges in collaborating to resolve the problem?
8. Data Consistency: How was the inconsistent information presented on the website identified and addressed? What were the potential impacts on users?
9. Preventive Measures: What steps will be taken to prevent a similar incident from occurring in the future? How can the affected code be improved to handle such scenarios?
10. Redundancy and Failover: Were there any redundancy or failover mechanisms in place, and how effective were they in ensuring service availability?
11. External Factors: Were there any external factors, such as increased traffic or maintenance activities, that might have contributed to the incident?
12. Post-Incident Testing: How will you validate the fixes and improvements made to the code and infrastructure? What additional tests will be performed to ensure system stability?
13. Documentation and Training: Will you update the documentation to include lessons learned from this incident? How will you train team members to avoid similar issues in the future?
14. User Impact and Communication: How will you communicate the post-mortem findings to users and stakeholders? Will there be any compensatory measures for affected users?
15. Continuous Improvement: How will you integrate the insights from this post-mortem into the development process to foster a culture of continuous improvement and resilience?

By having thumbs up/down on each question or simply having developers delete the irrelevant ones, the system can start to create a catalog of questions for a given incident.

2.6 Improvements and Benefits

The disclosure has explained computer-implemented techniques for automated processing of events to result in remediation or resolution using processes and architectures that can reduce MTTR. Unlike prior approaches that are very limited in terms of data sources, the present embodiments use a diverse set of data sources including but not limited to customer service statistics and operational content. Embodiments are configured to execute algorithms that use and process information in a manner engineered to reduce the MTTR. Embodiments are capable of fully automated incident resolution with nearly zero MTTR to higher resolution times in the case of more complex incidents that require human intervention. Using these techniques, enterprises can reduce MTTR and the number of people involved in an incident.

3. IMPLEMENTATION EXAMPLE—HARDWARE OVERVIEW

According to one embodiment, the techniques described herein are implemented by at least one computing device. The techniques may be implemented in whole or in part using a combination of at least one server computer and/or other computing devices coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. To accomplish the described techniques, such computing devices may combine custom hard-wired logic, ASICs, or FPGAs with custom programming. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 7:
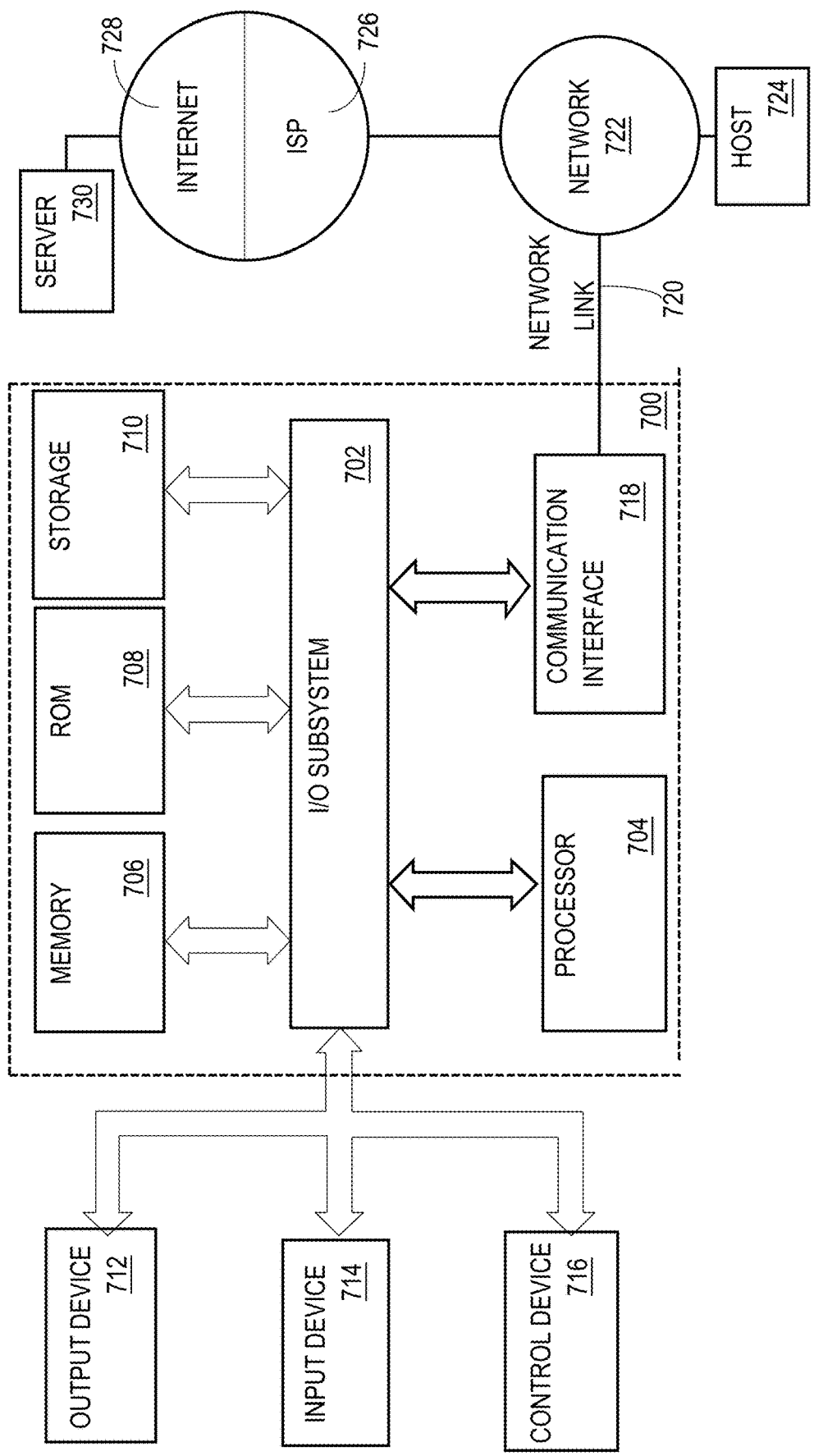
FIG. 7 illustrates a computer system with which one embodiment could be implemented.

FIG. 7 is a block diagram that illustrates an example computer system with which an embodiment may be implemented. In the example of FIG. 7, a computer system 700 and instructions for implementing the disclosed technologies in hardware, software, or a combination of hardware and software are represented schematically, for example, as boxes and circles, at the same level of detail that is commonly used by persons of ordinary skill in the art to which this disclosure pertains for communicating about computer architecture and computer systems implementations.

Computer system 700 includes an input/output (I/O) subsystem 702, which may include a bus and/or other communication mechanism(s) for communicating information and/or instructions between the components of the computer system 700 over electronic signal paths. The I/O subsystem 702 may include an I/O controller, a memory controller, and at least one I/O port. The electronic signal paths are represented schematically in the drawings, such as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller and/or a special-purpose microprocessor such as an embedded system, a graphics processing unit (GPU), or a digital signal processor or ARM processor. Processor 704 may comprise an integrated arithmetic logic unit (ALU) or be coupled to a separate ALU.

Computer system 700 includes one or more units of memory 706, such as a main memory, coupled to I/O subsystem 702 for electronically digitally storing data and instructions to be executed by processor 704. Memory 706 may include volatile memory such as various forms of random-access memory (RAM) or other dynamic storage device. Memory 706 may also be used for storing temporary variables or other intermediate information during the execution of instructions to be executed by processor 704. Such instructions, when stored in non-transitory computer-readable storage media accessible to processor 704, can render computer system 700 into a special-purpose machine customized to perform the operations specified in the instructions.

Computer system 700 includes non-volatile memory such as read-only memory (ROM) 708 or other static storage devices coupled to I/O subsystem 702 for storing information and instructions for processor 704. The ROM 708 may include various forms of programmable ROM (PROM), such as erasable PROM (EPROM) or electrically erasable PROM (EEPROM). A unit of persistent storage 710 may include various forms of non-volatile RAM (NVRAM), such as FLASH memory, solid-state storage, magnetic disk, or optical disks such as CD-ROM or DVD-ROM and may be coupled to I/O subsystem 702 for storing information and instructions. Storage 710 is an example of a non-transitory computer-readable medium that may be used to store instructions and data, which, when executed by processor 704, causes performing computer-implemented methods to execute the techniques herein.

The instructions in memory 706, ROM 708, or storage 710 may comprise one or more instructions organized as modules, methods, objects, functions, routines, or calls. The instructions may be organized as one or more computer programs, operating system services, or application programs, including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation, application, and data storage layer, such as a relational database system using a structured query language (SQL) or no SQL, an object store, a graph database, a flat file system, or other data storage.

Computer system 700 may be coupled via I/O subsystem 702 to at least one output device 712. In one embodiment, output device 712 is a digital computer display. Examples of a display that may be used in various embodiments include a touchscreen display, a light-emitting diode (LED) display, a liquid crystal display (LCD), or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators or servos.

At least one input device 714 is coupled to I/O subsystem 702 for communicating signals, data, command selections, or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. The control device 716 may be a touchpad, a mouse, a trackball, or cursor direction keys for communicating direction information and command selections to processor 704 and for controlling cursor movement on an output device 712, such as a display. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism, or other control device. An input device 714 may include a combination of multiple input devices, such as a video camera and a depth sensor.

In another embodiment, computer system 700 may comprise an Internet of Things (IoT) device in which one or more of the output device 712, input device 714, and control device 716 are omitted. Or, in such an embodiment, the input device 714 may comprise one or more cameras, motion detectors, thermometers, microphones, seismic detectors, other sensors or detectors, measurement devices or encoders, and the output device 712 may comprise a special-purpose display such as a single-line LED or LCD display, one or more indicators, a display panel, a meter, a valve, a solenoid, an actuator or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware, and interfaces for generating position reporting packets, notifications, pulse or heartbeat signals, or other recurring data transmissions that specify a position of the computer system 700, alone or in combination with other application-specific data, directed toward host computer 724 or server computer 730.

Computer system 700 may implement the techniques described herein using customized hard-wired logic, at least one ASIC or FPGA, firmware, and/or program instructions or logic which, when loaded and used or executed in combination with the computer system, causes or programs the computer system to operate as a special-purpose machine. According to one embodiment, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative embodiments, hard-wired circuitry may be used in place of or in combination with software instructions.

The term "storage media," as used herein, refers to any non-transitory media that store data and/or instructions that cause a machine to operate in a specific fashion. Such storage media may comprise non-volatile media and/or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like.

Storage media is distinct but may be used with transmission media. Transmission media participates in transferring information between storage media. For example, transmission media includes coaxial cables, copper wire and fiber optics, and wires comprising a bus of I/O subsystem 702. Transmission media can also be acoustic or light waves generated during radio-wave and infrared data communications.

Various forms of media may carry at least one sequence of at least one instruction to processor 704 for execution. For example, the instructions may initially be carried on a remote computer's magnetic disk or solid-state drive. The remote computer can load the instructions into its dynamic memory and send them over a communication link such as a fiber optic, coaxial cable, or telephone line using a modem. A modem or router local to computer system 700 can receive the data on the communication link and convert the data to a format that can be read by computer system 700. For instance, a receiver such as a radio frequency antenna or an infrared detector can receive the data carried in a wireless or optical signal, and appropriate circuitry can provide the data to I/O subsystem 702, such as placing the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to a bus or I/O subsystem 502. Communication interface 718 provides a two-way data communication coupling to a network link(s) 720 directly or indirectly connected to at least one communication network, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 722 broadly represents a local area network (LAN), wide-area network (WAN), campus network, internetwork, or any combination thereof. Communication interface 718 may comprise a LAN card to provide a data communication connection to a compatible LAN, a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic, or optical signals over signal paths that carry digital data streams representing various types of information.

Network link 720 typically provides electrical, electromagnetic, or optical data communication directly or through at least one network to other data devices, using, for example, satellite, cellular, Wi-Fi, or BLUETOOTH technology. For example, network link 720 may connect through network 722 to a host computer 724.

Furthermore, network link 720 may connect through network 722 or to other computing devices via internetworking devices and/or computers operated by an Internet Service Provider (ISP) 726. ISP 726 provides data communication services through a worldwide packet data communication network called Internet 728. A server computer 730 may be coupled to Internet 728. Server computer 730 broadly represents any computer, data center, virtual machine, or virtual computing instance with or without a hypervisor or computer executing a containerized program system such as DOCKER or KUBERNETES. Server computer 730 may represent an electronic digital service that is implemented using more than one computer or instance, and that is accessed and used by transmitting web services requests, uniform resource locator (URL) strings with parameters in HTTP payloads, API calls, app services calls, or other service calls. Computer system 700 and server computer 730 may form elements of a distributed computing system that includes other computers, a processing cluster, a server farm, or other organizations of computers that cooperate to perform tasks or execute applications or services. Server computer 730 may comprise one or more instructions organized as modules, methods, objects, functions, routines, or calls. The instructions may be organized as one or more computer programs, operating system services, or application programs, including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server computer 730 may comprise a web application server that hosts a presentation layer, application layer, and data storage layer, such as a relational database system using a structured query language (SQL) or no SQL, an object store, a graph database, a flat file system or other data storage.

Computer system 700 can send messages and receive data and instructions, including program code, through the network(s), network link 720, and communication interface 718. In the Internet example, server computer 730 might transmit a requested code for an application program through Internet 728, ISP 726, local network 722, and communication interface 718. The received code may be executed by processor 704 as it is received and/or stored in storage 710 or other non-volatile storage for later execution.

The execution of instructions, as described in this section, may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In an embodiment, switches may be performed when tasks perform input/output operations when a task indicates that it can be switched or on hardware interrupts. Time-sharing may be implemented to allow fast response for interactive user applications by rapidly performing context switches to provide the appearance of concurrent execution of multiple processes. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. Accordingly, the specification and drawings are to be regarded in an illustrative rather than a restrictive sense. The sole and exclusive indicator of the scope of the invention, and what is intended by the applicants to be the scope of the invention, is the literal and equivalent scope of the set of claims issued from this application in the specific form in which such claims issue, including any subsequent correction.

The invention claimed is:

1. A computer-implemented method executed using one or more processors of an incident management system, the computer-implemented method comprising:
    receiving a notification of an incident associated with a computer system, and in response to receiving the notification:
        extracting an error message from the notification;
        reading a set of computer program code changes that have been implemented in the computer system;
        matching the error message to the set of computer program code changes and outputting a set of one or more candidate code changes that correspond to the error message;
        matching the set of computer program code changes that have been implemented in the computer system, and outputting the set of one or more candidate code changes that correspond to the error message by programmatically calling a neural network-based machine-learning model and providing a stacktrace and the set of computer program code changes to create embeddings;
        executing an inference stage of the neural network-based machine-learning model to produce an embeddings index; and
        selecting, from the embeddings index, a top-N set of code changes as one or more particular code changes from among the set of one or more candidate code changes;
    based on the set of one or more candidate code changes, generating an automatic remediation for the incident; and
    using the one or more processors of the incident management system, executing the automatic remediation on the computer system.

2. The computer-implemented method of claim 1, further comprising:
    causing presenting the automatic remediation in one or more visual displays of one or more computer display devices respectively associated with one or more stakeholder computers that are communicatively coupled to the incident management system; and
    executing the automatic remediation on the computer system only in response to input from at least one particular stakeholder computer among the one or more stakeholder computers, the input specifying an approval of the automatic remediation.

3. The computer-implemented method of claim 1, the incident comprising any of reduced service performance, downtime, outage, or failure of the computer system.

4. The computer-implemented method of claim 1, further comprising:
    creating and transiently storing in memory a prompt comprising at least the error message and the one or more particular code changes from among the set of one or more candidate code changes;
    transmitting the prompt to a machine-learning model and receiving a response from the machine-learning model; and
    determining that the response from the machine-learning model contains a root-cause explanation corresponding to the incident and, in response, causing presenting the root-cause explanation in one or more visual displays of one or more computer display devices respectively associated with one or more stakeholder computers that are communicatively coupled to the incident management system.

5. The computer-implemented method of claim 4, further comprising:
    creating and transiently storing in memory the prompt comprising an instruction to explain the one or more particular code changes from among the set of one or more candidate code changes; or
    creating and transiently storing in memory the prompt comprising an instruction to explain the error message; or creating and transiently storing in memory the prompt comprising an instruction to state whether the one or more particular code changes from among the set of one or more candidate code changes relate to the error message.

6. The computer-implemented method of claim 4, further comprising receiving a stacktrace corresponding to the incident and matching the stacktrace to the set of computer program code changes that have been implemented in the computer system and outputting the set of one or more candidate code changes that correspond to the error message.

7. The computer-implemented method of claim 4, wherein the machine-learning model comprises a large language model (LLM).

8. The computer-implemented method of claim 4, further comprising transmitting the prompt to the machine-learning model by calling an application programming interface (API) of a large language model (LLM) comprising OPENAI GPT 3.5 or OPENAI GPT 4.0.

9. The computer-implemented method of claim 4, further comprising:
receiving a user message at a conversational agent executing in the incident management system;
using the conversational agent, identifying a task represented in the user message;
initiating, from among a worker pool of worker threads, an execution of a task worker thread corresponding to the task; and
transmitting the prompt to the machine-learning model when the task corresponds to one or more particular tasks from among a plurality of different tasks.

10. The computer-implemented method of claim 1, the neural network-based machine-learning model having been trained using a training data set comprising at least 1,000 pairs of function code and function documentation.

11. The computer-implemented method of claim 1, further comprising programmatically calling a T5 Transformer-based machine-learning model and providing the stacktrace and the set of computer program code changes to create embeddings.

12. One or more non-transitory computer-readable storage media storing one or more sequences of instructions which, when executed using one or more processors of an incident management system, cause the one or more processors to execute:
receiving a notification of an incident associated with a computer system, and in response to receiving the notification:
extracting an error message from the notification;
reading a set of computer program code changes that have been implemented in the computer system;
matching the error message to the set of computer program code changes and outputting a set of one or more candidate code changes that correspond to the error message;
matching the set of computer program code changes that have been implemented in the computer system and outputting the set of one or more candidate code changes that correspond to the error message by programmatically calling a neural network-based machine-learning model and providing a stacktrace and the set of computer program code changes to create embeddings;
executing an inference stage of the neural network-based machine-learning model to produce an embeddings index; and
selecting, from the embeddings index, a top-N set of code changes as one or more particular code changes from among the set of one or more candidate code changes;
based on the set of one or more candidate code changes, generating an automatic remediation for the incident; and
using the one or more processors of the incident management system, executing the automatic remediation on the computer system.

13. The one or more non-transitory computer-readable storage media of claim 12, further comprising one or more sequences of instructions which, when executed using the one or more processors cause the one or more processors to execute:
causing presenting the automatic remediation in one or more visual displays of one or more computer display devices respectively associated with one or more stakeholder computers that are communicatively coupled to the incident management system; and
executing the automatic remediation on the computer system only in response to input from at least one particular stakeholder computer among the one or more stakeholder computers, the input specifying an approval of the automatic remediation.

14. The one or more non-transitory computer-readable storage media of claim 12, the incident comprising any of reduced service performance, downtime, outage, or failure of the computer system.

15. The one or more non-transitory computer-readable storage media of claim 14, further comprising one or more sequences of instructions which, when executed using the one or more processors cause the one or more processors to execute:
receiving a user message at a conversational agent executing in the incident management system;
using the conversational agent, identifying a task represented in the user message;
initiating, from among a worker pool of worker threads, an execution of a task worker thread corresponding to the task; and
transmitting a prompt to the machine-learning model when the task corresponds to an incident context task, change events task, or service context task.

16. The one or more non-transitory computer-readable storage media of claim 12, further comprising one or more sequences of instructions which, when executed using the one or more processors cause the one or more processors to execute:
creating and transiently storing in memory a prompt comprising at least the error message and the one or more particular code changes from among the set of one or more candidate code changes;
transmitting the prompt to a machine-learning model and receiving a response from the machine-learning model; and
determining that the response from the machine-learning model contains a root-cause explanation corresponding to the incident and, in response, causing presenting the root-cause explanation in one or more visual displays of one or more computer display devices respectively associated with one or more stakeholder computers that are communicatively coupled to the incident management system.

17. The one or more non-transitory computer-readable storage media of claim 16, further comprising one or more sequences of instructions which, when executed using the one or more processors cause the one or more processors to execute:

creating and transiently storing in memory the prompt comprising an instruction to explain the one or more particular code changes from among the set of one or more candidate code changes; or creating and transiently storing in memory the prompt comprising an instruction to explain the error message; or creating and transiently storing in memory the prompt comprising an instruction to state whether the one or more particular code changes from among the set of one or more candidate code changes relate to the error message.

18. The one or more non-transitory computer-readable storage media of claim 16, further comprising one or more sequences of instructions which, when executed using the one or more processors cause the one or more processors to execute receiving a stacktrace corresponding to the incident and matching the stacktrace to the set of computer program code changes that have been implemented in the computer system and outputting the set of one or more candidate code changes that correspond to the error message.

19. The one or more non-transitory computer-readable storage media of claim 18, further comprising one or more sequences of instructions which, when executed using the one or more processors cause the one or more processors to execute matching the stacktrace to the set of computer program code changes that have been implemented in the computer system and outputting the set of one or more candidate code changes that correspond to the error message by:

programmatically calling a T5 Transformer-based machine-learning model and providing the stacktrace and the set of computer program code changes to create embeddings;

executing an inference stage of the T5 Transformer-based machine-learning model to produce an embeddings index; and selecting, from the embeddings index, a top-N set of code changes as the one or more particular code changes from among the set of one or more candidate code changes.

20. The one or more non-transitory computer-readable storage media of claim 19, the T5 Transformer-based machine-learning model having been trained using a training data set comprising at least 1,000 pairs of function code and function documentation.

21. The one or more non-transitory computer-readable storage media of claim 16, wherein the machine-learning model comprises a large language model (LLM).

22. The one or more non-transitory computer-readable storage media of claim 16, further comprising one or more sequences of instructions which, when executed using the one or more processors cause the one or more processors to execute transmitting the prompt to the machine-learning model by calling an application programming interface (API) of a large language model (LLM) comprising OPENAI GPT 3.5 or OPENAI GPT 4.0.

* * * * *